US011461944B2

(12) United States Patent
Kusakari et al.

(10) Patent No.: US 11,461,944 B2
(45) Date of Patent: Oct. 4, 2022

(54) REGION CLIPPING METHOD AND RECORDING MEDIUM STORING REGION CLIPPING PROGRAM

(71) Applicant: FUJITSU LIMITED, Kawasaki (JP)

(72) Inventors: Ippei Kusakari, Ota (JP); Asako Kitaura, Kawasaki (JP); Takushi Fujita, Chigasaki (JP)

(73) Assignee: FUJITSU LIMITED, Kawasaki (JP)

(*) Notice: Subject to any disclaimer, the term of this patent is extended or adjusted under 35 U.S.C. 154(b) by 108 days.

(21) Appl. No.: 17/064,005

(22) Filed: Oct. 6, 2020

(65) Prior Publication Data

US 2021/0134034 A1 May 6, 2021

(30) Foreign Application Priority Data

Oct. 30, 2019 (JP) ............................ JP2019-197743

(51) Int. Cl.
*G06T 11/60* (2006.01)
*G06T 7/215* (2017.01)
*G06T 7/11* (2017.01)
*G06T 7/70* (2017.01)

(52) U.S. Cl.
CPC ................ *G06T 11/60* (2013.01); *G06T 7/11* (2017.01); *G06T 7/215* (2017.01); *G06T 7/70* (2017.01); *G06T 2207/10012* (2013.01); *G06T 2207/30252* (2013.01)

(58) Field of Classification Search
CPC . G06T 11/60; G06T 7/11; G06T 7/215; G06T 7/70; G06T 7/75; G06T 2207/10012; G06T 2207/30252; G06T 2207/10016; G06T 2207/10028; G06T 2207/20081; G06T 2207/20132; G06T 2207/30256; G06V 10/25; G06V 20/582; G06V 20/584; G06V 20/588
See application file for complete search history.

(56) References Cited

U.S. PATENT DOCUMENTS

2003/0043030 A1 3/2003 Kudo
2011/0091086 A1* 4/2011 Seko ...................... A61B 8/463 382/131
2012/0307006 A1* 12/2012 Tsukagoshi .......... H04N 19/597 348/42
2019/0051056 A1 2/2019 Chiu et al.
2019/0087659 A1* 3/2019 Kaehler .................. G06T 7/579

FOREIGN PATENT DOCUMENTS

JP H09-243389 A 9/1997
JP 2003-085562 A 3/2003
JP 2008-298698 A 12/2008
JP 2009-053922 A 3/2009

OTHER PUBLICATIONS

EESR—The Extended European Search Report of European Patent Application No. 20198940.7 dated Mar. 25, 2021.

* cited by examiner

*Primary Examiner* — John B Strege
(74) *Attorney, Agent, or Firm* — Fujitsu Patent Center

(57) ABSTRACT

A region clipping method for clipping a region of a target object out of an image is performed by a computer. The method includes: referencing a memory storing three-dimensional positional information of the target object; and calculating, by using information on an imaging position for the image and orientation for the image, the region of the target object within the image from the three-dimensional positional information.

19 Claims, 17 Drawing Sheets

V-SLAM
IMAGING POSITION AND ORIENTATION
CAMERA PARAMETER
PERSPECTIVE TRANSFORMATION
102
103
TRAVELING DIRECTION OF MOVING BODY (CAMERA)
100
101a
104
101b
105
50
AUTOMATIC CLIPPING
FEATURE IMAGE (TEACHER DATA FOR MACHINE LEARNING)

V-SLAM
IMAGING POSITION AND ORIENTATION
CAMERA PARAMETER
PERSPECTIVE TRANSFORMATION
102
103
100
101a
104
TRAVELING DIRECTION OF MOVING BODY (CAMERA)
101b
AUTOMATIC CLIPPING
105
50
FEATURE IMAGE (TEACHER DATA FOR MACHINE LEARNING)

200
IMAGE
211
STORAGE SECTION
205
THREE-DIMENSIONAL POSITION OF TARGET OBJECT
214
IMAGE INPUT SECTION
201
INTRA-IMAGE POSITION CALCULATOR
202
REGION IDENTIFYING SECTION
203
REGION OUTPUT SECTION
204
IMAGING POSITION AND ORIENTATION
212
CAMERA PARAMETER
213

IMAGE A
211
IMAGE INPUT SECTION
201
IMAGING POSITION AND ORIENTATION Aa
212
CAMERA PARAMETER Ap
213
STORAGE SECTION
205
THREE-DIMENSIONAL POSITION Ao OF TARGET OBJECT
214
INTRA-IMAGE POSITION CALCULATOR
202
INTRA-IMAGE POSITION RESULT Ar
511
REGION IDENTIFYING SECTION
203
POSITIONAL INFORMATION Ai
512
REGION IDENTIFYING SECTION
204
REGION IMAGE Ab
513

FIG. 6

IMAGING POSITION AND ORIENTATION Aa ~212

| VIDEO ID | VidId | 20191002_071000_001 |
|---|---|---|
| FRAME NUMBER | FrmNum | 141 |
| POSITION | PosX | -10015.6 |
| | PosY | -38337.805 |
| | PosZ | 13.554 |
| ORIENTATION | Roll | -1.286 |
| | Pitch | -2.131 |
| | Yaw | 65.491 |

| | | |
|---|---|---|
| FOCAL LENGTH | fx | 968.7548 |
| | fy | 970.2972 |
| OPTICAL CENTER | cx | 982.918 |
| | cy | 548.1811 |
| DISTORTION CORRECTION COEFFICIENT | k1 | -0.30387 |
| | k2 | 0.092433 |
| | p1 | -0.0003 |
| | p2 | 0.000648 |
| | p3 | -0.0127 |

FIG. 8

THREE-DIMENSIONAL POSITION Ao OF TARGET OBJECT 214

| TARGET OBJECT ID | objID | 1 |
|---|---|---|
| TARGET OBJECT TYPE | objType | 8 |
| NUMBER OF POINTS REPRESENTING TARGET OBJECT | PosNum | 4 |
| RIGHT-ANGLE PLANAR SYSTEM NUMBER | CoordNum | 9 |
| REAL COORDINATE THREE DIMENSIONS [m] | Pos[0].x | -9946.05283 |
| | Pos[0].y | -38173.5689 |
| | Pos[0].z | 19.556403 |
| | Pos[1].x | -9946.05332 |
| | Pos[1].y | -38173.5267 |
| | Pos[1].z | 19.226615 |
| | Pos[2].x | -9945.022811 |
| | Pos[2].y | -38173.9059 |
| | Pos[2].z | 19.186373 |
| | Pos[3].x | -9945.05121 |
| | Pos[3].y | -38173.9875 |
| | Pos[3].z | 19.53184 |

FIG. 10

INTRA-IMAGE POSITION RESULT Ar 511

| VIDEO ID | VidId | 20191002_071000_001 |
|---|---|---|
| FRAME NUMBER | FrmNum | 141 |
| TARGET OBJECT ID | ObjID | 1 |
| TARGET OBJECT TYPE | ObjType | 8 |
| INTRA-IMAGE POSITION RESULT | Result | 0.75 |
| NUMBER OF POINTS REPRESENTING TARGET OBJECT | PosNum | 4 |
| INTRA-IMAGE DETERMINATION RESULTS OF POINTS | ResultPos[0] | 1 |
| | ResultPos[1] | 0 |
| | ResultPos[2] | 1 |
| | ResultPos[3] | 1 |
| TWO-DIMENSIONAL POSITIONS OF POINTS [dot] | 2DPos[0].x | 969.91 |
| | 2DPos[0].y | 20.28 |
| | 2DPos[1].x | 1015.24 |
| | 2DPos[1].y | -8.15 |
| | 2DPos[2].x | 1033.71 |
| | 2DPos[2].y | 120.88 |
| | 2DPos[3].x | 953.12 |
| | 2DPos[3].y | 129.32 |

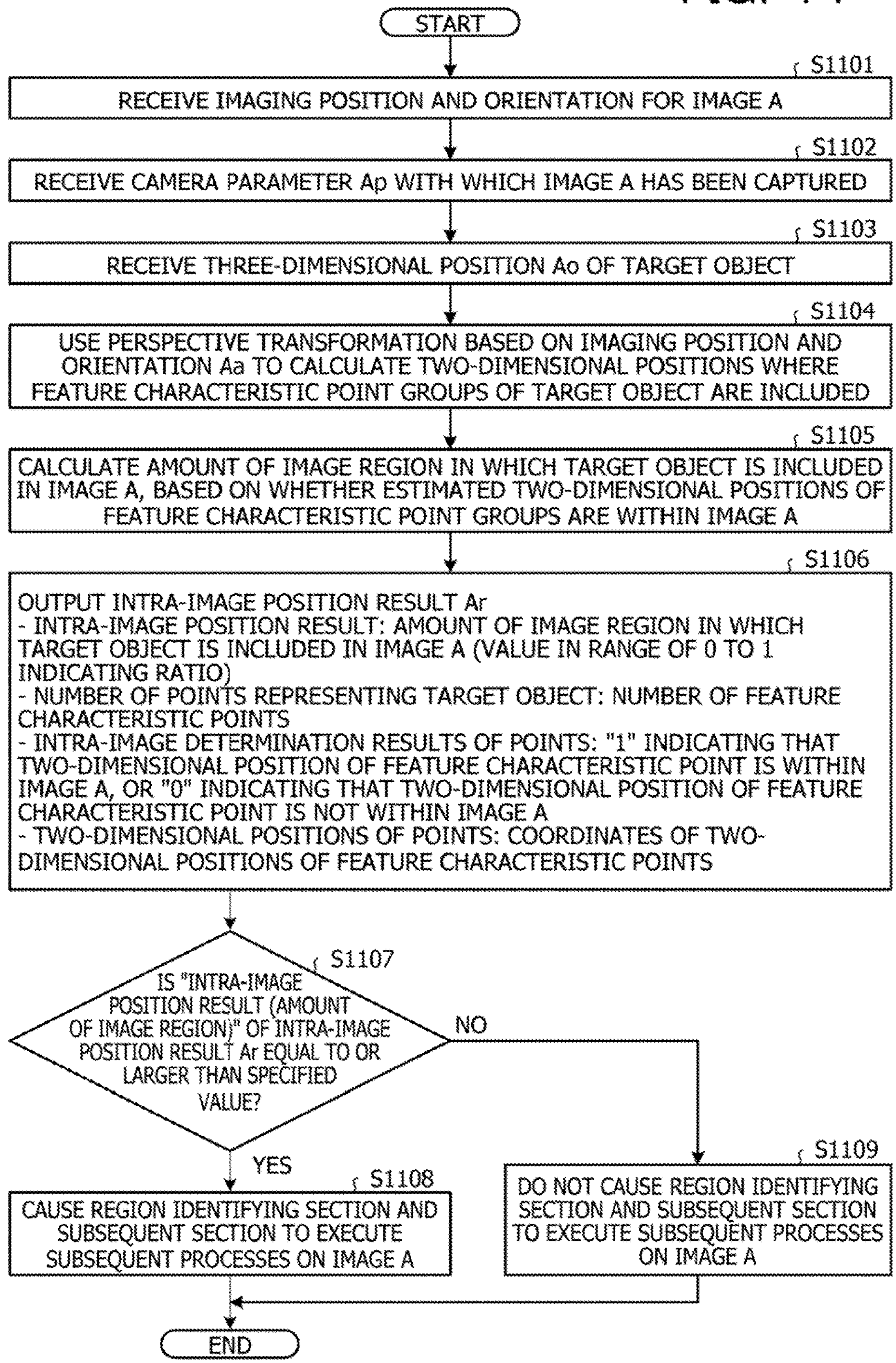
FIG. 11
START
S1101
RECEIVE IMAGING POSITION AND ORIENTATION FOR IMAGE A
S1102
RECEIVE CAMERA PARAMETER Ap WITH WHICH IMAGE A HAS BEEN CAPTURED
S1103
RECEIVE THREE-DIMENSIONAL POSITION Ao OF TARGET OBJECT
S1104
USE PERSPECTIVE TRANSFORMATION BASED ON IMAGING POSITION AND ORIENTATION Aa TO CALCULATE TWO-DIMENSIONAL POSITIONS WHERE FEATURE CHARACTERISTIC POINT GROUPS OF TARGET OBJECT ARE INCLUDED
S1105
CALCULATE AMOUNT OF IMAGE REGION IN WHICH TARGET OBJECT IS INCLUDED IN IMAGE A, BASED ON WHETHER ESTIMATED TWO-DIMENSIONAL POSITIONS OF FEATURE CHARACTERISTIC POINT GROUPS ARE WITHIN IMAGE A
S1106
OUTPUT INTRA-IMAGE POSITION RESULT Ar
- INTRA-IMAGE POSITION RESULT: AMOUNT OF IMAGE REGION IN WHICH TARGET OBJECT IS INCLUDED IN IMAGE A (VALUE IN RANGE OF 0 TO 1 INDICATING RATIO)
- NUMBER OF POINTS REPRESENTING TARGET OBJECT: NUMBER OF FEATURE CHARACTERISTIC POINTS
- INTRA-IMAGE DETERMINATION RESULTS OF POINTS: "1" INDICATING THAT TWO-DIMENSIONAL POSITION OF FEATURE CHARACTERISTIC POINT IS WITHIN IMAGE A, OR "0" INDICATING THAT TWO-DIMENSIONAL POSITION OF FEATURE CHARACTERISTIC POINT IS NOT WITHIN IMAGE A
- TWO-DIMENSIONAL POSITIONS OF POINTS: COORDINATES OF TWO-DIMENSIONAL POSITIONS OF FEATURE CHARACTERISTIC POINTS
S1107
IS "INTRA-IMAGE POSITION RESULT (AMOUNT OF IMAGE REGION)" OF INTRA-IMAGE POSITION RESULT Ar EQUAL TO OR LARGER THAN SPECIFIED VALUE?
NO
YES
S1108
CAUSE REGION IDENTIFYING SECTION AND SUBSEQUENT SECTION TO EXECUTE SUBSEQUENT PROCESSES ON IMAGE A
S1109
DO NOT CAUSE REGION IDENTIFYING SECTION AND SUBSEQUENT SECTION TO EXECUTE SUBSEQUENT PROCESSES ON IMAGE A
END

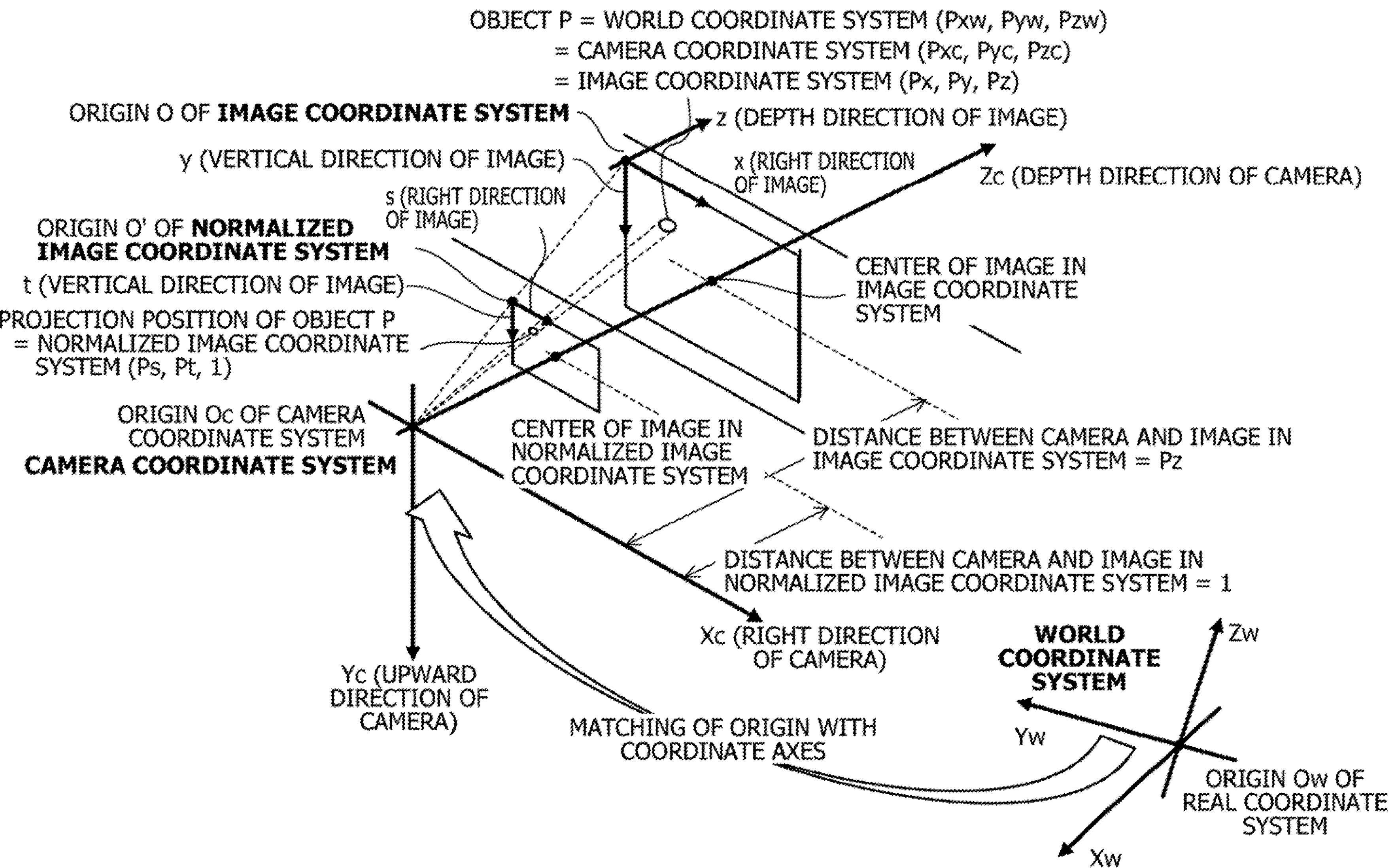
FIG. 12
OBJECT P = WORLD COORDINATE SYSTEM (Pxw, Pyw, Pzw)
= CAMERA COORDINATE SYSTEM (Pxc, Pyc, Pzc)
= IMAGE COORDINATE SYSTEM (Px, Py, Pz)
ORIGIN O OF IMAGE COORDINATE SYSTEM
z (DEPTH DIRECTION OF IMAGE)
y (VERTICAL DIRECTION OF IMAGE)
x (RIGHT DIRECTION OF IMAGE)
Zc (DEPTH DIRECTION OF CAMERA)
s (RIGHT DIRECTION OF IMAGE)
ORIGIN O' OF NORMALIZED IMAGE COORDINATE SYSTEM
t (VERTICAL DIRECTION OF IMAGE)
PROJECTION POSITION OF OBJECT P = NORMALIZED IMAGE COORDINATE SYSTEM (Ps, Pt, 1)
CENTER OF IMAGE IN IMAGE COORDINATE SYSTEM
ORIGIN Oc OF CAMERA COORDINATE SYSTEM
CAMERA COORDINATE SYSTEM
CENTER OF IMAGE IN NORMALIZED IMAGE COORDINATE SYSTEM
DISTANCE BETWEEN CAMERA AND IMAGE IN IMAGE COORDINATE SYSTEM = Pz
DISTANCE BETWEEN CAMERA AND IMAGE IN NORMALIZED IMAGE COORDINATE SYSTEM = 1
Xc (RIGHT DIRECTION OF CAMERA)
Yc (UPWARD DIRECTION OF CAMERA)
MATCHING OF ORIGIN WITH COORDINATE AXES
WORLD COORDINATE SYSTEM
Zw
Yw
Xw
ORIGIN Ow OF REAL COORDINATE SYSTEM

| VIDEO ID | VidId | 20191002_071000_001 |
|---|---|---|
| FRAME NUMBER | FrmNUm | 141 |
| TARGET OBJECT ID | ObjId | 1 |
| TARGET OBJECT TYPE | ObjType | 8 |
| NUMBER OF POINTS REPRESENTING TARGET OBJECT | PosNum | 4 |
| COORDINATES OF POSITIONS IN IMAGE [dot] | Pos[0].x | 964.393 |
| | Pos[0].y | 550.439 |
| | Pos[1].x | 964.343 |
| | Pos[1].y | 552.24 |
| | Pos[2].x | 970.296 |
| | Pos[2].y | 552.329 |
| | Pos[3].x | 970.285 |
| | Pos[3].y | 550.437 |

| VIDEO ID | VidId | 20191002_071000_001 |
|---|---|---|
| FRAME NUMBER | FrmNUm | 141 |
| TARGET OBJECT ID | ObjId | 1 |
| TARGET OBJECT TYPE | ObjType | 8 |
| STORAGE DESTINATION | OutPath | C:¥Data¥TrafficSign_50 |
| FILE NAME | OutName | 20191002_071000_001-141.png |

REGION CLIPPING METHOD AND RECORDING MEDIUM STORING REGION CLIPPING PROGRAM

CROSS-REFERENCE TO RELATED APPLICATION

This application is based upon and claims the benefit of priority of the prior Japanese Patent Application No. 2019-197743, filed on Oct. 30, 2019, the entire contents of which are incorporated herein by reference.

FIELD

The embodiment discussed herein is related to a region clipping method for clipping a region out of an image, and a recording medium storing a region clipping program.

BACKGROUND

For example, the following two tasks are performed to generate an image of a target object, for example, a feature or the like as teacher data for machine learning. First, an image search task is performed to visually search for an image including the target object and to be used as teacher data from a large amount of video data. Then, a region specifying task is performed to manually specify an image region including the target object and included in the image searched in the image search task.

As a related existing technique, there is a technique for using feature information including positional information of a target feature to execute an image recognition process on the target feature for image information. As another related existing technique, there is a technique for executing perspective transformation to transform a virtual three-dimensional space into a second-dimensional coordinate system based on a point of view where the same position as a point of interest that has been set in the virtual three-dimensional space is treated as a point of gaze. Examples of related art are Japanese Laid-open Patent Publication No. 2008-298698 and Japanese Laid-open Patent Publication No. 2009-053922.

SUMMARY

According to an aspect of the embodiments, a region clipping method for clipping a region of a target object out of an image, the method including: referencing a storage section storing three-dimensional positional information of the target object; and calculating, by using information on an imaging position for the image and orientation for the image, the region of the target object within the image from the three-dimensional positional information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating an example of a data configuration of an imaging position and orientation;

FIG. 8 is an explanatory diagram illustrating an example of a data configuration of a three-dimensional position of a target object;

FIG. 10 is an explanatory diagram illustrating an example of a data configuration of an intra-image position result;

FIG. 11 is a flowchart illustrating an example of a procedure for a series of processes to be executed by an intra-image position calculator;

FIG. 12 is an explanatory diagram illustrating details of a perspective transformation process;

DESCRIPTION OF EMBODIMENTS

In the existing technique, however, the tasks of searching for an image of a target object and specifying a region are manually performed as described above, and it takes time to perform the tasks and the number of processes in the tasks is large. Therefore, there is a problem that a sufficient amount of data may not be efficiently collected in order to use an image of a target object as teacher data for machine learning.

According to an aspect, the present disclosure aims to automatically identify an image region of a target object included in an image.

In an aspect, a region clipping method for clipping a region of a target object out of an image is provided. In the region clipping method, an information processing device references a storage section storing three-dimensional positional information of the target object and uses information on an imaging position for the image and orientation for the image to calculate the region of the target object within the image from the three-dimensional positional information.

According to an aspect of the present disclosure, it is possible to automatically identify an image region of a target object included in an image.

Hereinafter, an embodiment of a region clipping method disclosed herein and a region clipping program disclosed herein is described in detail with reference to the drawings.

Embodiment

Figure 1:
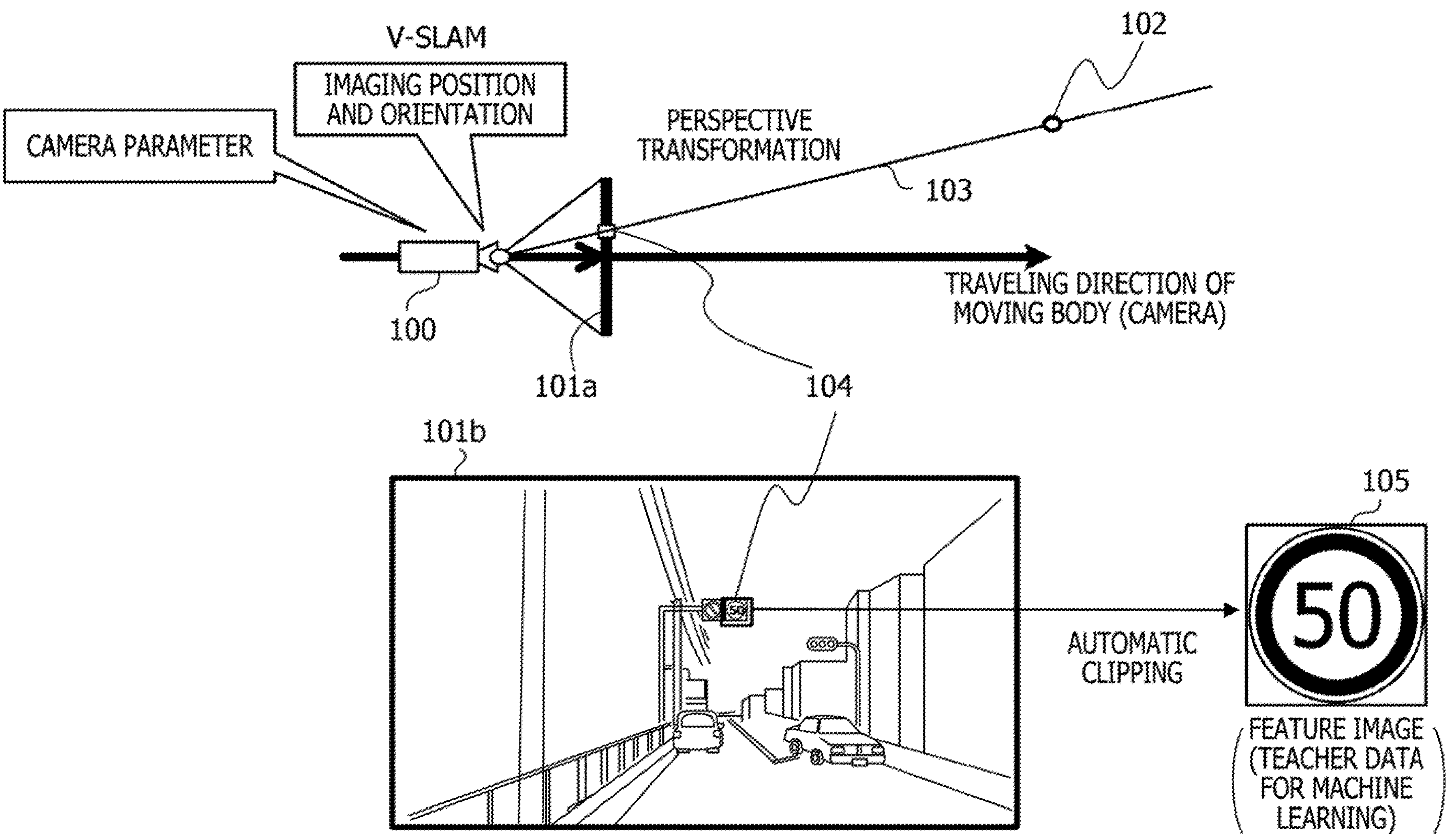
FIG. 1 is an explanatory diagram illustrating an example of an overview of a region clipping method and a region clipping program.

First, an overview of a region clipping method according to an embodiment and a region clipping program according to the embodiment is described using FIG. 1. FIG. 1 is an explanatory diagram illustrating an example of the overview of the region clipping method and the region clipping program.

In FIG. 1, a camera 100 is, for example, an imaging device mounted on a moving body and captures an image. The captured image includes a feature (sign) that is a target object. A sign 101*a* indicates a camera imaging surface (side surface), and a sign 101*b* indicates a camera imaging surface (front surface). On the camera imaging surface (front surface) 101*b*, the image captured during traveling of the moving body includes an image of a road. The image of the road on the camera imaging surface 101*b* includes features, such as a vehicle traveling in front of the moving body, an oncoming vehicle, a guardrail, a traffic light, a road sign, a building, and a utility pole.

The feature to be clipped is a road sign indicating a speed limit of 50 km/h. A sign 102 indicates a three-dimensional position of the feature (sign). For example, the sign 102 indicates a coordinate position where the feature actually exists. A sign 103 indicates a straight line (hereinafter referred to as target object presence straight line) on which the target object exists. As illustrated in FIG. 1, the position of an intersection of the target object presence straight line 103 and the camera imaging surface (side surface) 101*a* is the position 104 of the feature (target object) within the image.

To calculate the position 104 of the feature within the image, the three-dimensional position 102 of the feature (sign) is subjected to perspective transformation using an imaging position for the image, orientation for the image, and a camera parameter. By executing the perspective transformation, the position of the concerned feature on the camera imaging surface 101 may be estimated (calculated) from the three-dimensional position 102 of the feature (sign).

When the position 104 of the feature (target object) within the image is estimated (calculated) in the foregoing manner, an image region of the feature may be automatically clipped based on the estimated (calculated) position of the feature within the image. A sign 105 indicates the automatically clipped feature image (road sign indicating the speed limit of 50 km/h). The automatically clipped feature image may be used as teacher data for machine learning.

The image may be captured by the camera 100 that is the imaging device. Alternatively, the image may be acquired by another method. The image (video) may be captured by the imaging device during traveling. To clip the image of the feature, it is sufficient if there is information on the three-dimensional position 102 of the feature, information on the imaging position for the image and the orientation for the image, and information on the camera parameter.

A service is carried out to collect (probe) data (video) from an in-vehicle device of a normal vehicle or a driving recorder, acquire information of the moving body and the features present on and around the road, update and provide traffic information and information of an obstacle on the road, update a high-accurate map for automatic driving, and analyze a peripheral situation for automatic driving at the time of image capturing. The normal vehicle is an example of the moving body.

There is a technique for simultaneously generating a traveling route for a moving body and a peripheral environment map using, as input, data acquired during traveling of the moving body and related to a peripheral situation. The technique is referred to as simultaneous localization and mapping (SLAM). SLAM is a generic term for techniques for simultaneously generating a traveling route (position and orientation of a concerned vehicle) for the concerned vehicle and a peripheral environment map (three-dimensional position map for peripheral objects or the like) using, as input, in-vehicle data acquired during traveling and related to a peripheral situation. The in-vehicle data is, for example, laser imaging detection and ranging (LIDAR)) data.

Among the SLAM techniques, a technique for using, as input, video captured by a moving body to estimate the position and orientation of a camera during traveling of the moving body is referred to as Visual-SLAM (hereinafter referred to as "V-SLAM"). V-SLAM is a technique for using, as input, video captured by an in-vehicle camera and using a change in an subject included in the captured video to estimate and generate a traveling route (position and orientation of a concerned vehicle) for the concerned vehicle and a peripheral environment map (three-dimensional position map of a group of image characteristic points of a subject around the vehicle). V-SLAM may estimate the position and orientation of the concerned vehicle from video of a normal vehicle.

V-SLAM extracts, from chronologically continuous images (video) captured by a moving camera, a large number of image characteristics that may be associated with points in a space. Then, V-SLAM uses similarities to associate the extracted image characteristics with each other between the continuous images and calculates a solution for a geometric condition to be satisfied by all the image characteristics between the continuous images. It is, therefore, possible to calculate the positions of the image characteristics in the space and imaging positions for the images and orientation for the images.

Information on the imaging position for the image captured by the camera 100 and the orientation for the image may be acquired by V-SLAM using the image. The position and the orientation of the camera that may be acquired by V-SLAM or the like may be estimated by either an in-vehicle device described later or the information processing device 200.

The in-vehicle device may be normally mounted together with the camera 100 on the moving body and collects GNSS information from a satellite and collects video from the in-vehicle camera. The moving body is, for example, a normal vehicle, a business vehicle, such as a taxi, a two-wheel vehicle (motorcycle or bicycle), a large vehicle (bus or track), or the like. The moving body may be a car coupled to a network, such as the Internet, and configured to collect information. The moving body may be a ship that moves on the water, an airplane that moves over the sky, an unmanned airplane (drone), a self-moving robot, or the like.

The in-vehicle device collects information on video captured by the camera 100. For example, the in-vehicle device collects either positional information of the moving body and the camera at the time of the capturing of video or information of the camera 100 that is used to identify the camera parameter. The positional information may be acquired from the GNSS information that is an example of positioning information. The in-vehicle device may acquire, as information of the moving body, information of the orientation of the moving body, instead of using V-SLAM or the like to calculate the imaging position and the orientation. The information of the orientation of the moving body is collected from an orientation sensor, such as an inertial measurement unit (IMU), as described later. The in-vehicle device may collect information on an imaging time and the like.

The in-vehicle device may be a dedicated device mounted on the moving body or may be detachable. A mobile terminal device that is a smartphone, a tablet terminal device, or the like and has a communication function may be used in the moving body. All or some of various functions of the in-vehicle device may be achieved using a function included in the moving body.

Therefore, the expression "in-vehicle" of the in-vehicle device is not limited to the meaning of the dedicated device mounted on the moving body. The in-vehicle device may be any device as long as the in-vehicle device has a function of collecting information on the moving body.

The in-vehicle device acquires information (in-vehicle data) of the moving body that includes information on captured video and the GNSS information. The in-vehicle device stores the acquired in-vehicle data. The in-vehicle device may execute transmit the stored in-vehicle data to a server (information processing device 200 illustrated in FIG. 2 and described later) via a network (network 310 illustrated in FIG. 3 and described later) by radio communication.

The in-vehicle device may not include a communication section. For example, the in-vehicle device may not be coupled to the server via the network 310. In this case, data accumulated in the in-vehicle device may be input to the server offline (for example, manually via a recording medium).

The in-vehicle device may execute an entire process of clipping a region of a feature image out of an image captured by the camera 100 or execute a part of the process.

(Example of Functional Configuration of Information Processing Device)

Figure 2:
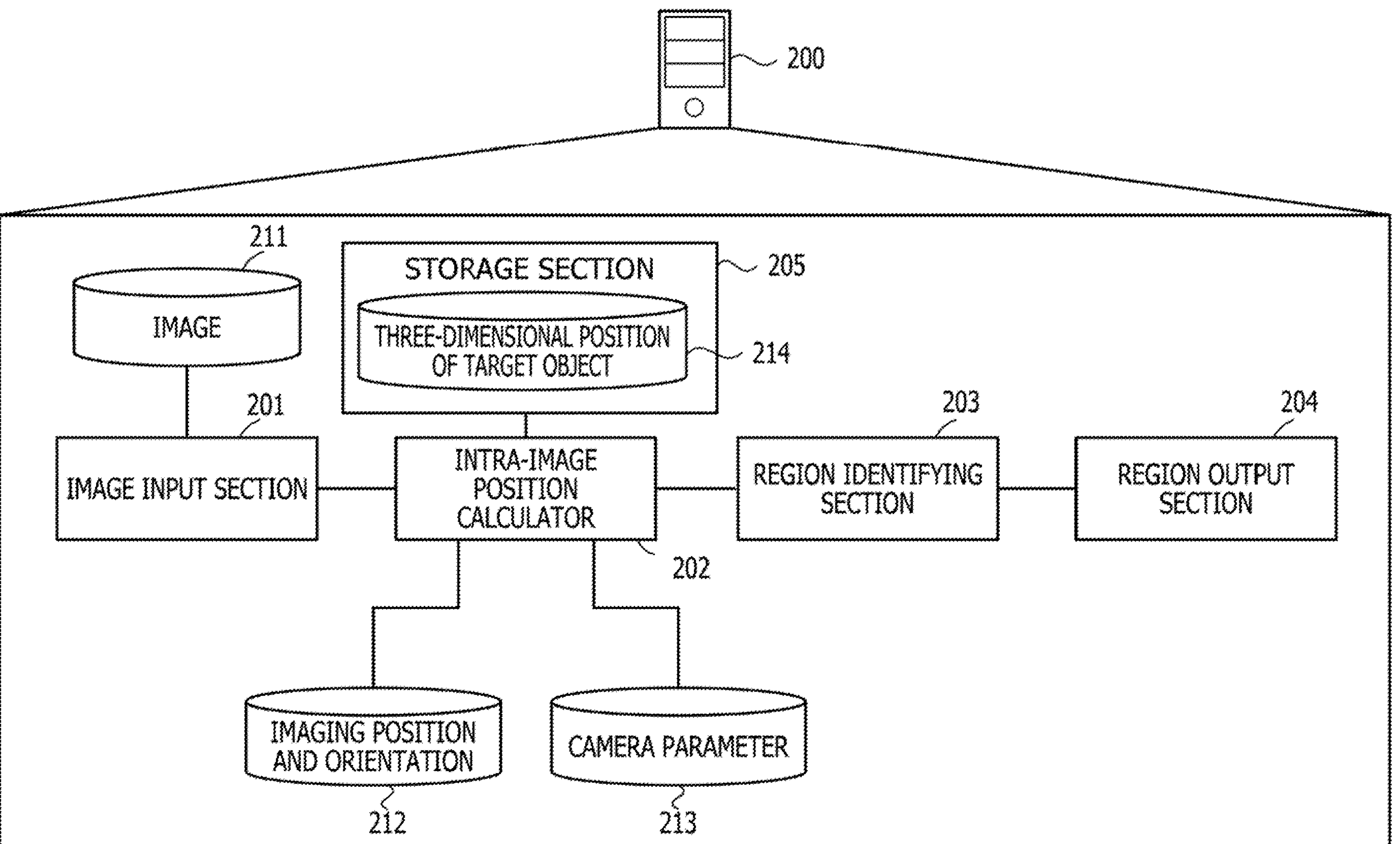
FIG. 2 is an explanatory diagram illustrating an example of a functional configuration of an information processing device that achieves the region clipping method.

FIG. 2 is an explanatory diagram illustrating an example of a functional configuration of the information processing device that achieves the region clipping method. In FIG. 2, one or multiple computers, such as one or multiple servers, achieve functions of the information processing device 200, for example. The multiple servers are coupled to each other via the network (network 310 illustrated in FIG. 3 and described later). A cloud computing system not illustrated may achieve the functions of the information processing device 200.

The information processing device (server) 200 includes an image input section 201, an intra-image position calculator 202, a region identifying section 203, and a region output section 204. The constituent sections 201 to 204 may form a controller of the information processing device 200. The information processing device 200 has information including an input image (image A) 211, an input imaging position and orientation (position and orientation Aa of an imaging device for obtaining the input image) 212, an input camera parameter (camera parameter Ap) 213, and an input three-dimensional position (three-dimensional position Ao of the target object) 214 of the target object.

The information processing device 200 may include a storage section 205. The storage section 205 may be included in another information processing device not illustrated, instead of being included in the information processing device 200. The information processing device 200 may acquire the foregoing information from the other information processing device via the network (network 310).

The image input section 201 receives the input of the image 211 before clipping a region of the target object (feature image 105) from the image 211. The input of the image 211 may be achieved by inputting image data already captured and stored in a predetermined storage region or by extracting a predetermined image from video data captured by the imaging device (camera 100 illustrated in FIG. 1).

The image input section 201 acquires information (imaging position and orientation 212) that corresponds to the image 211 to be input and is related to the imaging position for the image 211 and the orientation for the image 211. The image input section 201 acquires information (camera parameter 213) on parameters of the imaging device that has captured the image 211. The imaging position and orientation 212 are sensor data collected by the in-vehicle device described above, or are data calculated by the in-vehicle device or the information processing device 200 in an arbitrary known process, such as V-SLAM. The information of the camera parameter 213 may be acquired in advance, instead of being acquired after viewing of the image 211 in the case where the camera to be processed is limited in advance or the like.

The intra-image position calculator 202 and the region identifying section 203 reference the storage section 205 storing three-dimensional positional information on a three-dimensional position 214 of the target object and uses the imaging position and orientation 212 for the image 211 to calculate a region of the target object within the image 211 from the three-dimensional positional information on the three-dimensional position 214. The intra-image position calculator 202 and the region identifying section 203 may reference the storage section 205 storing the three-dimensional positional information on the three-dimensional position 214 of the target object and use not only the imaging position and orientation 212 for the image 211 but also the camera parameter 213 of the imaging device to calculate the region of the target object within the image 211 from the three-dimensional positional information on the three-dimensional position 214.

For example, the intra-image position calculator 202 determines whether the target object is included in the image 211. When the target is included in the image 211 as a result of the determination by the intra-image position calculator 202, the region identifying section 203 may calculate the region of the target object within the image 211.

The region output section 204 clips an image of the target object out of the image 211 based on the result (intra-image position result Ar511 described later) of calculating the region of the target object within the image 211 by the region identifying section 203.

The storage section 205 stores three-dimensional positions 214 of multiple types of various target objects (features). Therefore, by specifying the type of the target object or the like, the three-dimensional position 214 of the specified target object may be extracted from the storage section 205.

In FIG. 2, the information processing device (server) 200 includes the image input section 201, the intra-image position calculator 202, the region identifying section 203, the region output section 204, and the storage section 205. Although not illustrated, one or more of the functional sections 201, 202, 203, 204, and 205 may be included in the information processing device 200 and the in-vehicle device included in the moving body or may be included in the in-vehicle device included in the moving body, instead of being included in the information processing device 200.

When the in-vehicle device includes one or more of the functional sections 201, 202, 203, 204, and 205, details of a process to be executed by the one or more functional sections included in the in-vehicle device may be the same as details of a process to be executed by the information processing device 200. When the in-vehicle device has the foregoing configuration, the in-vehicle device mounted on the moving body may output teacher data for machine learning based on an image captured by the imaging device mounted on the moving body.

(Example of Hardware Configuration of Information Processing Device)

Figure 3:
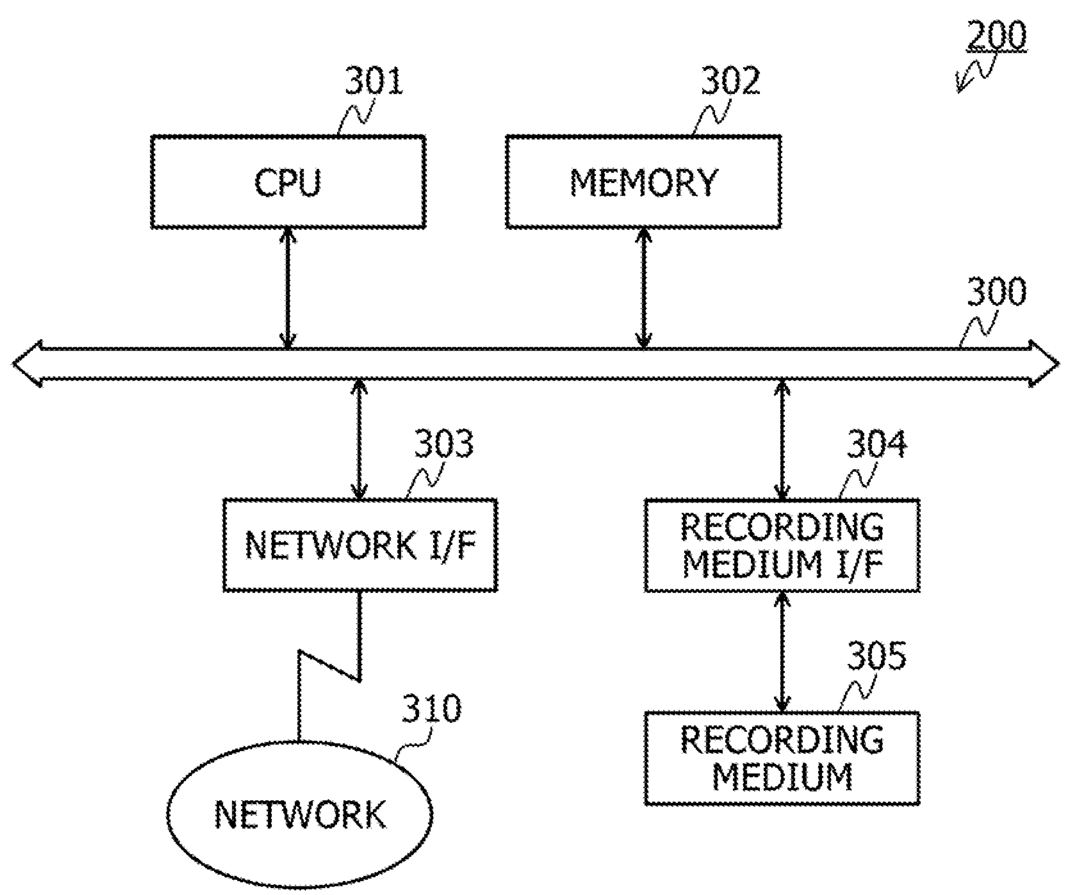
FIG. 3 is a block diagram illustrating an example of a hardware configuration of the information processing device.

FIG. 3 is a block diagram illustrating an example of a hardware configuration of the information processing device. The server that is an example of the information processing device 200 includes a central processing unit (CPU) 301, a memory 302, a network interface (I/F) 303, a recording medium I/F 304, and a recording medium 305. The constituent sections are coupled to each other via a bus 300.

The CPU 301 controls the entire information processing device 200. The memory 302 includes a read-only memory (ROM), a random-access memory (RAM), and a flash ROM. For example, the flash ROM and the ROM store various programs, while the RAM is used as a work area of the CPU 301. The programs stored in the memory 302 are loaded into the CPU 301 and cause the CPU 301 to execute coded processes.

The network I/F 303 is coupled to the network 310 via a communication line and coupled to other devices (for example, the in-vehicle device not illustrated, another server, and another system) via the network 310. The network I/F 303 serves as an interface with the network 310 and the inside of the information processing device 200 and controls input and output of data from and to the other devices. As the network I/F 303, a modem, a LAN adaptor, or the like may be used, for example.

The recording medium I/F 304 controls reading and writing of data from and to the recording medium 305 in accordance with control by the CPU 301. The recording medium 305 stores data written under control by the recording medium I/F 304. As the recording medium 305, a magnetic disk, an optical disc, or the like may be used, for example.

The information processing device 200 may include, for example, a solid-state drive (SSD), a keyboard, a pointing device, a display, and the like, as well as the foregoing constituent sections.

Although not illustrated, the in-vehicle device may have not only the imaging device but also a hardware configuration that is the same as or similar to that of the information processing device 200.

(Procedure for Series of Processes of Region Clipping Method)

Figure 4:
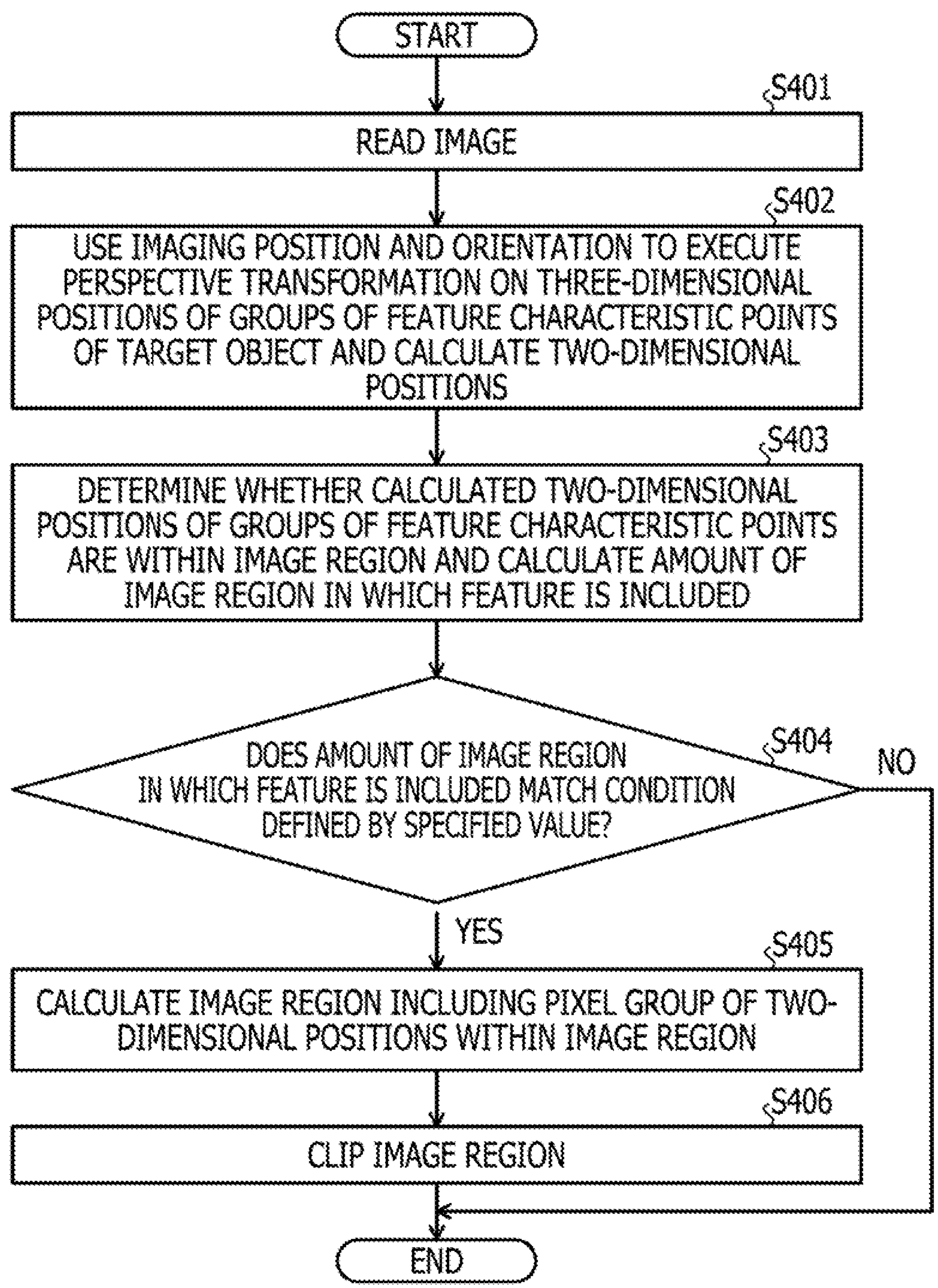
FIG. 4 is a flowchart illustrating an example of a procedure for a series of processes of the region clipping method.

FIG. 4 is a flowchart illustrating an example of a procedure for a series of processes of the region clipping method. In the flowchart of FIG. 4, the information processing device 200 reads an arbitrary image 211 (step S401). The process of step S401 is, for example, executed by the image input section 201 illustrated in FIG. 2.

Then, the information processing device 200 uses an imaging position and orientation 212 to execute perspective transformation on three-dimensional positions 214 of groups of feature characteristic points of a target object and estimates (calculates) two-dimensional positions of the feature characteristic points (step S402). The camera parameter 213 may be also used to estimate the two-dimensional positions of the feature characteristic points.

Then, the information processing device 200 determines whether the estimated (calculated) two-dimensional positions of the feature characteristic points are within an image region of the image 211, for example, within the camera imaging surface 101, and uses information indicating whether the two-dimensional positions are within the image region to calculate the amount of the image region in which the target object is included in the image 211 (step S403).

Then, the information processing device 200 determines whether the calculated amount of the image region in which the feature is included matches a specified value, for example, a condition determined by a system or the like (step S404). For example, when the amount of the image region in which the feature is included is a value in a range of 0 (indicating that the entire feature is not included in the image region) to 1 (indicating that the entire feature is included in the image region), whether the amount of the image region in which the feature is included is equal to or larger than the specified value is used as the condition. When the amount of the image region in which the feature is included is equal to or larger than the specified value, the amount of the image region in which the feature is included is regarded to match the condition. Only an image in which the entire target object is more likely to be included as the specified value is closer to 1 is used to clip an image region. When only an image in which the target object is completely included is to be used, the specified value to be used for the condition may be set to 1. When only an image in which approximately ½ or more of the target object is included is to be used, the specified value may be set to 0.5.

The processes of steps (steps S402 to S404) are, for example, executed by the intra-image position calculator 202 illustrated in FIG. 2.

When the estimated (calculated) amount of the image region in which the feature is included does not match the condition, for example, when the amount of the image region in which the feature is included is smaller than the specified value (No in step S404), the information processing device 200 does not execute any operation on the image 211 and terminates the series of processes. It is, therefore, possible to remove an image that is included in the image 211 and in which the feature (target object) is not included, and extract only the image in which the feature (target object) is included. Accordingly, a process of searching for the image may be efficiently and quickly executed.

On the other hand, when the estimated amount of the image region in which the feature is included matches the condition, for example, when the amount of the image region in which the feature is included equal to or larger than the specified value (Yes in step S404), the information processing device 200 calculates an image region including a pixel group of the two-dimensional positions within the image region (step S405). The process of step S405 is, for example, executed by the region identifying section 203 illustrated in FIG. 2.

After that, the information processing device 200 clips the image region calculated in step S404 out of the image 211 (step S406). The process of step S406 is, for example, executed by the region output section 204 illustrated in FIG. 2. Then, the information processing device 200 terminates the series of processes.

The series of processes are executed for each image. In this manner, the information processing device 200 may automatically clip the image region of the target object (feature) out of the arbitrary image 211 based on how much the target object is included in the image. Information of the clipped image region of the target object (feature) may be stored as teacher data. Specific details of the constituent sections 201 to 204 that execute the series of processes and the constituent section 205 are described below.

(Specific Details of Constituent Sections 201 to 205)

Figure 5:
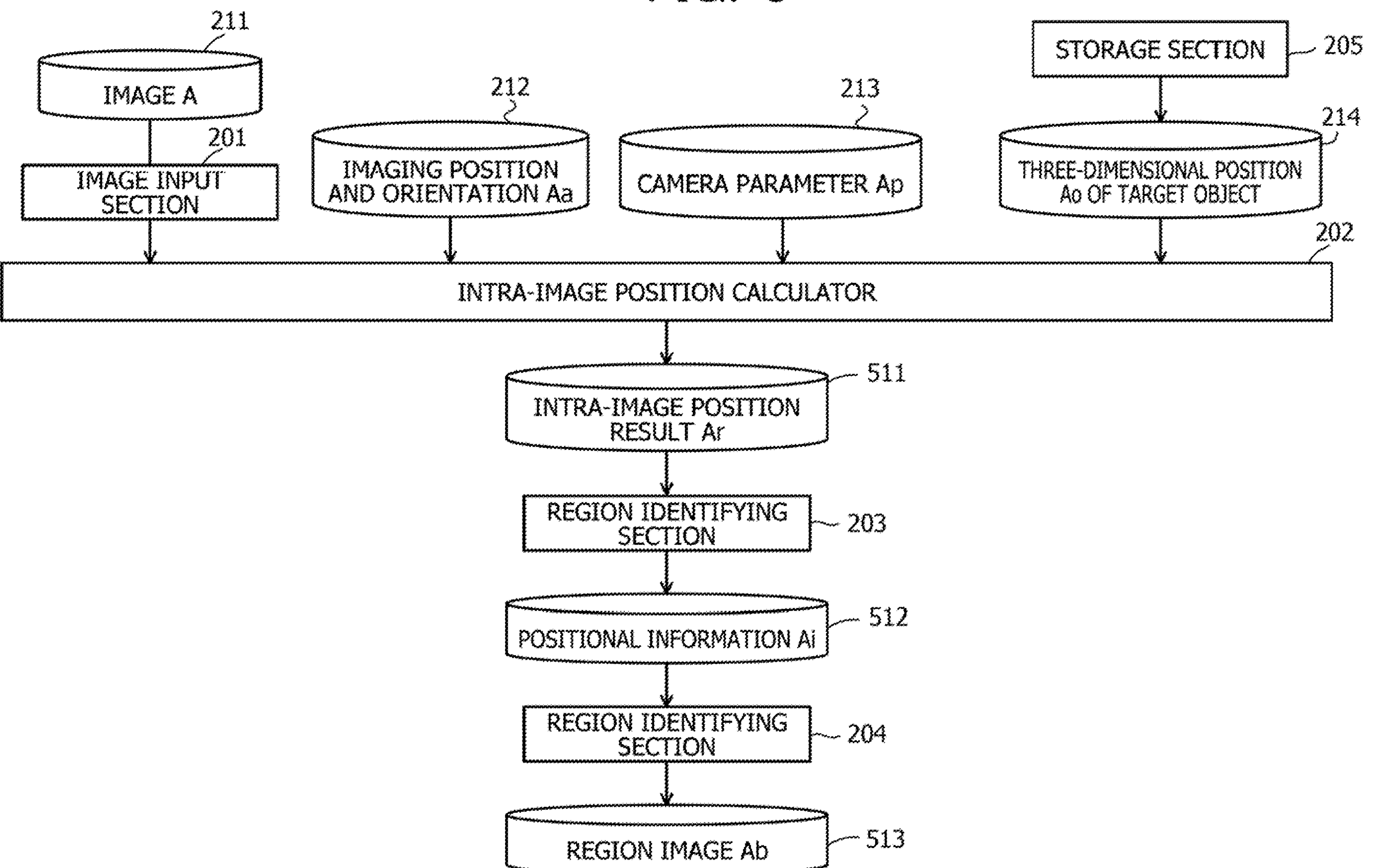
FIG. 5 is an explanatory diagram illustrating an example of constituent sections and details of information.

FIG. 5 is an explanatory diagram illustrating an example of the constituent sections and details of information. FIG. 5 illustrates an example in which, for one image (image A211), an imaging position and orientation of the camera that has captured the image, and three-dimensional positional information on a three-dimensional position of the target object are used to estimate a region in which the target object on the image is included and clip the region.

In FIG. 5, the constituent sections are the image input section 201, the intra-image position calculator 202, the region identifying section 203, the region output section 204, and the storage section 205. In FIG. 5, the information includes the image A211, an imaging position and orientation Aa212, a camera parameter Ap213, a three-dimensional position Ao214 of the target object, an intra-image position result Ar511, positional information Ai512, and a region image Ab513.

(Details of Process by Image Input Section 201)

In FIG. 5, the image input section 201 inputs the arbitrary image A211 to the intra-image position calculator 202. In this case, the imaging position and orientation Aa212 for the image A211 and the camera parameter Ap213 of the camera that has captured the image A211 are input to the intra-image position calculator 202. For example, the CPU 301 executes a program stored in the memory 302 in the information processing device 200 illustrated in FIG. 3, thereby enabling the image input section 201 to achieve functions of the image input section 201. Alternatively, the network I/F 303 or the recording medium I/F 304 enables the image input section 201 to achieve the functions of the image input section 201.

(Details of Imaging Position and Orientation Aa212)

The imaging position and orientation Aa212 are information corresponding to the image A211 and include, for example, three-axis positional information and three-dimensional vector direction information on real coordinates. FIG. 6 is an explanatory diagram illustrating an example of a data configuration of the imaging position and orientation Aa. As illustrated in FIG. 6, the imaging position and orientation Aa212 include various information including a "video ID", a "frame number", a "position", and "orientation".

The "video ID" is identification information uniquely identifying video including the image A211. The "frame number" is information on a number of a frame in which the image A211 in the video is included. The image A211 may be identified by the "video ID" and the "frame number".

The "position" is the three-axis positional information on the real coordinates (world coordinates) that is related to the imaging position and corresponds to the image A211. The three-axis positional information may be represented by, for example, a latitude (PosX), a longitude (PosY), and a height (PosZ). The "orientation" is information on a three-dimensional vector direction related to the imaging orientation. The three-dimensional vector direction information on the imaging orientation may be represented by a roll, a pitch, and a yaw that represent rotation.

The three-axis positional information on the image A211 and the three-dimensional vector direction information on the image A211 may be acquired from sensors (positioning sensor, such as Global Positioning System (GPS), orientation sensor, such as IMU, and the like). The IMU detects angles (or angular velocities) and acceleration on three axes. The angles and the acceleration on the three axes define a motion. The IMU is also referred to as inertial navigation unit (INU), inertial guidance unit (IGU), or inertial reference unit (IRU).

Basically, the three-dimensional angular velocities and the acceleration are calculated by a three-axis gyroscope sensor and a three-directional accelerometer. To improve the reliability, other types of sensors, such as a pressure gauge, a flowmeter, and a GPS, may be mounted. Normally, it is preferable that the IMU be located at the center of gravity of the moving body having the IMU mounted thereon.

For example, the foregoing information may be acquired by an arbitrary image processing method, such as V-SLAM, as described above. It is, therefore, possible to calculate the positions (image characteristic point group map) of the image characteristics in the space, imaging positions for the images, and orientation for the images. The imaging positions and the orientation in the real coordinate system may be calculated using V-SLAM and positional coordinates of the GPS, and the calculated results may be used as the imaging position and orientation Aa212.

(Details of Camera Parameter Ap213)

Figure 7:
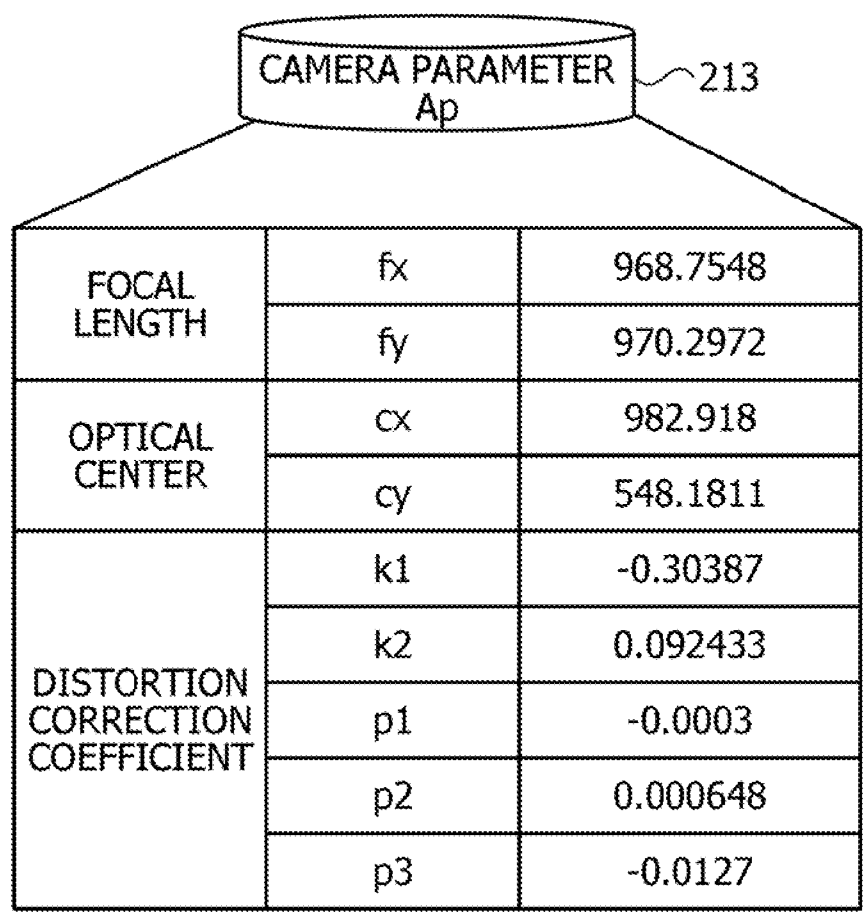
FIG. 7 is an explanatory diagram illustrating an example of a data configuration of a camera parameter.

The camera parameter Ap213 is information indicating specific internal parameters of the camera that has captured the image A211. FIG. 7 is an explanatory diagram illustrating an example of a data configuration of the camera parameter Ap. As illustrated in FIG. 7, the camera parameter Ap213 includes various information including a "focal length", an "optical center", and a "distortion correction coefficient".

The "focal length" is information on a focal length of the camera and may be represented by fx and fy. The "optical center" is information on a position through which an optical axis of a lens surface of the camera passes. The "optical center" may be represented by center's coordinates (cx, cy). The "distortion correction coefficient" is information on a coefficient for correcting a distortion caused by a characteristic of a lens of the camera and may be represented by radial distortion coefficients (k1, k2) of the lens and circumferential distortion coefficients (p1 to p3) of the lens.

(Details of Storage Section 205 and Details of Three-Dimensional Position Ao214 of Target Object)

As illustrated in FIG. 5, the three-dimensional position Ao214 of the target object is input to the intra-image position calculator 202. The three-dimensional position Ao214 of the target object may be stored in the storage section 205.

The three-dimensional position Ao214 of the target object is information indicating the position of the target object using one or more three-dimensional representative positions. The target object is to be extracted. FIG. 8 is an explanatory diagram illustrating an example of a data configuration of the three-dimensional position Ao of the target object. As illustrated in FIG. 8, a "target object ID" is identification information uniquely identifying the target object, and a "target object type" is information indicating the type of the target object.

The "number of points representing the target object" indicates the number of points representing the target object. For example, one central point of the target object may represent the target object, or four points circumscribing the target object represent the target object. The three-dimensional position Ao214 may include a "right-angle planar system number". Since the "number of points representing the target object" is "4", "real coordinate three dimensions"

are indicated by four coordinate positions Pos[0] to Pos[3]. Each of the four coordinate positions Pos[0] to Pos[3] is represented by three dimensions x, y, and z.

Although the points representing the target object are the four coordinate points circumscribing the target object, the points representing the target object are not limited to this. For example, the single central point of the target object may represent the target object. Alternatively, the number of points representing the target object may be smaller than 4 or larger than 4.

A coordinate point of the target object that exists at the three-dimensional position Ao214 of the target object may be acquired from a feature database (DB) not illustrated. The coordinate point of the target object that exists at the three-dimensional position Ao214 of the target object may be acquired by triangulation. The triangulation is a method for estimating a three-dimensional position of the target object from imaging positions and orientation of cameras and positions of the same target object within multiple images.

Figure 9:
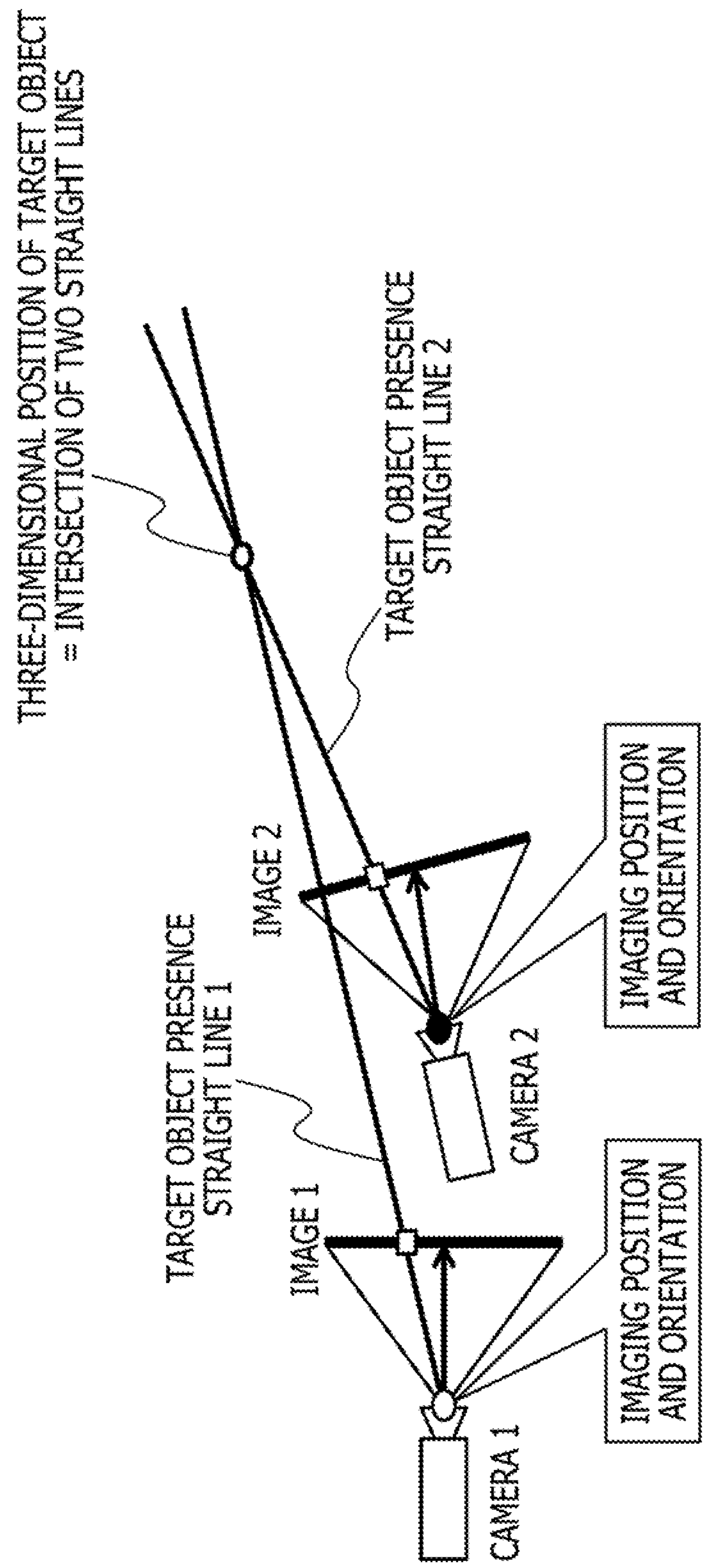
FIG. 9 is an explanatory diagram illustrating details of a triangulation process.

FIG. 9 is an explanatory diagram illustrating details of the triangulation process. As illustrated in FIG. 9, the target object exists on straight lines (hereinafter referred to as target object presence straight lines 1 and 2 in some cases) coupling the positions of cameras 1 and 2 to positions of the target object within images 1 and 2. Therefore, an intersection of the target object presence line 1 coupling the position of the camera 1 to the position of the target object within the image 1 captured by the camera 1 and the target object presence line 2 coupling the position of the camera 2 to the position of the target object within the image 2 captured by the camera 2 is the three-dimensional position of the target object. The three-dimensional position of the target object may be the three-dimensional position Ao214 of the target object.

Information on the imaging positions and the orientation that are used for the triangulation may be acquired by an arbitrary known method. For example, the information of the imaging positions and the orientation may be acquired by a sensor, like the imaging position and orientation Aa212, or may be acquired by image processing, such as V-SLAM.

(Details of Process by Intra-Image Position Calculator 202 and Details of Intra-Image Position Result Ar511)

Next, details of a process by the intra-image position calculator 202 are described. As illustrated in FIG. 5, the intra-image position calculator 202 calculates positions (two-dimensional positions) corresponding to three-dimensional coordinate points of the target object in the image based on the imaging position and orientation Aa212 for the image A211, the camera parameter Ap213 of the camera that has captured the image A211, and the three-dimensional position Ao214 of the target object. Subsequently, the intra-image position calculator 202 determines whether the two-dimensional positions are included in the image A211. The intra-image position calculator 202 calculates, from the results of the determination, the amount of an image region in which the target object is included in the image A211. Then, the intra-image position calculator 202 outputs the calculated amount as the intra-image position result Ar51.

For example, the CPU 301 executes a program stored in the memory 302 in the information processing device 200 illustrated in FIG. 3, thereby enabling the intra-image position calculator 202 to achieve functions of the intra-image position calculator 202.

The intra-image position result Ar511 is information on a state in which the target object is included in the image A211. The intra-image position result Ar511 includes information on the result of the calculation executed by the intra-image position calculator 202 on the image A211. FIG. 10 is an explanatory diagram illustrating an example of a data configuration of the intra-image position result Ar. As illustrated in FIG. 10, the intra-image position result Ar511 includes various information including a "video ID", a "frame number", a "target object ID", a "target object type", and an "intra-image position result". The intra-image position result Ar511 may include the "number of points representing the target object", "intra-image determination results of the points", and "two-dimensional positions of the points".

The "video ID" is the identification information uniquely identifying the video including the image A211. The "frame number" is the information on the number of the frame in which the image A211 in the video is included. The "video ID" and the "frame number" are the same as the "video ID" and the "frame number" that are indicated in the imaging position and orientation Aa212 illustrated in FIG. 6. The "target object ID" is the identification information uniquely identifying the target object. The "target object type" is the information indicating the type of the target object. The "target object ID" and the "target object type" are the same as the "target object ID" and the "target object type" that are indicated in the three-dimensional position Ao214 of the target object that is illustrated in FIG. 8.

The "intra-image position result" is information on the amount of the image region in which the target object is included in the image A211. For example, the "intra-image position result" indicates the ratio of two-dimensional position groups of the target object that are within the image A211 to all two-dimensional position groups of the target object. When all the two-dimensional position groups of the target object are within the image A211, the "intra-image position result" indicates "1". When some of the two-dimensional position groups of the target object are within the image A211, for example, when three points included in two-dimensional position groups of the four points representing the target object are included in the image A211, the "intra-image position result" indicates "0.75". On the other hand, when all the two-dimensional position groups of the target object are outside the image A211 (or are not within the image A211), the "intra-image position result" indicates "0".

The "number of points representing the target object" is the same as the "number of points representing the target object" that is indicated in the three-dimensional position Ao215 of the target object that is illustrated in FIG. 8. The "number of points representing the target object" is the number of feature characteristic points of the target object.

Each of the "intra-image determination results of the points" is information indicating whether a three-dimensional coordinate point of a feature characteristic point of the target object, for example, a two-dimensional position group of the target object that corresponds to a representative point holding a real coordinate three-dimensional position illustrated in FIG. 8 is included in the image A211. The "intra-image determination results of the points" are held only for the "number of points representing the target object" in the same order as the real coordinate three-dimensional positions illustrated in FIG. 8. When the two-dimensional positions are within the image A211, the "intra-image determination results of the points" are "1". When the two-dimensional positions are not within the image A211, the "intra-image determination results of the points" are "0". Since the "number of points representing the target object" is "4", the "intra-image determination results of the points"

are indicated by four values of ResultPos[0] to ResultPos[3]. Each of the four values of ResultPos[0] to ResultPos[3] is "0" or "1".

The "two-dimensional positions of the points" are coordinate values of two-dimensional positions of the feature characteristic points of the target object within the image and are held only for the "number of points representing the target object" in the same order as the "intra-image determination results of the points" and the real coordinate three-dimensional positions illustrated in FIG. 8. Since the "number of points representing the target object" is "4", the "two-dimensional positions of the points" are indicated by four coordinate positions 2DPos[0] to 2DPos[3]. Each of the four coordinate positions 2DPos[0] to 2DPos[3] is represented by two dimensions x and y.

The "intra-image position result" may not indicate the ratio of the two-dimensional position groups of the target object that are within the image. The "intra-image position result" may be a result of determining any of two options, "0" indicating that the target object is not included in the image and "1" indicating that the target object is included in the image. For example, even a state in which some of the two-dimensional position groups of the target object are within the image may be treated as a state in which all the two-dimensional position groups of the target object are not within the image. In this state, the "intra-image position result" may be "0". In this case, the "intra-image determination results of the points" that indicate whether the two-dimensional position groups are within the image may not be held as the intra-image position result Ar511 and may be omitted.

The "intra-image position result" may not be the accurate ratio of the two-dimensional position groups within the image and may be an arbitrary hierarchical value. For example, any of four values (of 0 to 3, 0 indicating that the ratio is equal to or larger than 0 and smaller than 0.25, 1 indicating that the ratio is equal to or larger than 0.25 and smaller than 0.5, 2 indicating that the ratio is equal to or larger than 0.5 and smaller than 0.75, and 3 indicating that the ratio is equal to or larger than 0.75, or the like) may be calculated based on the magnitude of the ratio, and the calculated value may be used, instead of the ratio. When two values are used, instead of the ratio, the ratio described above is not calculated and the two values are substantially the same as the two options, "0" indicating that the target object is not included in the image and "1" indicating that the target object is included in the image.

When a large number of feature characteristic points of the target object exist at an upper portion of the target object, the positions of the feature characteristic points are biased, or the like, the ratio of two-dimensional positions of feature characteristic groups within an image region to two-dimensional positions of all the feature characteristic groups of the target object may be calculated, a value may be calculated by adding the arbitrary weight to the calculated ratio, and the calculated value may be a percentage value emphasizing that a small number of characteristic points of a lower portion of the target object are included in the image region or not included in the image region. Alternatively, the condition that a number N or more of emphasized characteristic points or a number N or more of characteristic points at the lower portion are included in the image may be used, as well as or instead of the condition defined using the ratio.

The "intra-image position result" may be calculated using information indicating that a point calculated from the two-dimensional positions of the feature characteristic points of the target object, for example, the center of gravity of the target object is included in the image. Whether the position of the center of gravity of the target object that is calculated using the two-dimensional positions of the feature characteristic point groups is included in the image is determined. When the position of the center of gravity of the target object is not included in the image, the "intra-image position result" is the value "0". When the position of the center of gravity of the target object is included in the image, the "intra-image position result" is the value "1". In this case, when all the two-dimensional positions of the feature characteristic point groups are not included in the image, the position of the center of gravity of the target object is not included in the image. Thus, a process of calculating whether the position of the center of gravity of the target object is included in the image may be omitted.

The area of a target object region included in the image may be calculated from the two-dimensional positions of the feature characteristic points of the target object. The area of an image region in which the target object region is included the image may be calculated. The "intra-image position result" may indicate the ratio of the areas. The area of the target object region may be calculated as the area of a polygon with vertices at the two-dimensional positions of the feature characteristic points of the target object. Intersections of sides of the polygon and straight lines corresponding to right, left, upper, and lower ends of a screen may be calculated. Then, the area of the image region in which the target object region is included in the image may be calculated as the area of a polygon with vertices at only the calculated intersections and the two-dimensional positions of the feature characteristic points within the screen. For example, the "intra-image position result" may be calculated as (the area of the target object region within the image)/(the area of the target object region).

The intra-image position calculator 202 determines, based on information on the "intra-image position result", whether the following process is to be executed on the image A211. For example, when the "intra-image position result" indicates the ratio of two-dimensional position groups included in the image to all the two-dimensional position groups of the target object, and the ratio is a value in a range of 0 to 1, only an image causing an "intra-image position result" matching the condition (for example, 0.5 or greater that is an intermediate value in the value range of the "intra-image position result") defined by the specified value determined in advance is used for the following process, an image causing an "intra-image position result" not matching the condition defined by the specified value is not used for the following process, and images are narrowed down to the image to be used for the process.

As described with reference to FIG. 2, when the specified value is a threshold to be used for a condition for selecting the image A211 that is used to clip an image region based on the amount of the target object included in the image A211, and the image A211 is to be limited to an image in which the amount of the target object included in the image A211 is large, the specified value is set to a value (close to 1 when the ratio of two-dimensional position groups included in the image to all the two-dimensional position groups of the target object is used) close to the maximum value in the value range of the "intra-image position result". As described above, an additional condition, for example, a condition for determining whether a two-dimensional position of an emphasized characteristic point is within the image may be used together with the condition defined by the specified value.

Next, a specific procedure for processes by the intra-image position calculator 202 is described. FIG. 11 is a flowchart illustrating an example of the procedure for the series of processes to be executed by the intra-image position calculator. In the flowchart of FIG. 11, the intra-image position calculator 202 receives the imaging position and orientation Aa for the image A211 (step S1101) and receives the camera parameter Ap with which the image A211 has been captured (step S1102). The intra-image position calculator 202 receives the three-dimensional position Ao of the target object (step S1103).

Then, the intra-image position calculator 202 uses "perspective transformation (process method) based on the imaging position and orientation Aa to calculate, as the two-dimensional position groups corresponding to the three-dimensional coordinate points of the target object, two-dimensional positions where the feature characteristic point groups of the target object are included in the image A211 (step S1104). Then, the intra-image position calculator 202 calculates the amount of the image region in which the target object is included in the image A211, based on whether the estimated two-dimensional positions of the feature characteristic point groups are within the image A211 (step S1105).

The intra-image position calculator 202 outputs, as the intra-image position result Ar511, the intra-image position result, the number of points representing the target object, the intra-image determination results of the points, and the two-dimensional positions of the points (step S1106). In this case, the intra-image position result indicates the amount (value in a range of 0 to 1 indicating the ratio) of the image region in which the target object is included in the image A211. The number of points representing the target object is the number of feature characteristic points, for example, the number (total number of two-dimensional position groups) of characteristic points of the target object. Each of the intra-image determination results of the points is "1" indicating that the two-dimensional position of the feature characteristic point is included in the image A211 or "0" indicating that the two-dimensional position of the feature characteristic point is not included in the image A211. The two-dimensional positions of the points indicate coordinates of two-dimensional positions of the feature characteristic points.

Then, the intra-image position calculator 202 determines whether the intra-image position result indicating the amount of the image region in which the target object that causes the intra-image position result Ar511 is included in the image is equal to or larger than the specified value set in advance (step S1107). When the intra-image position result is equal to or larger than the specified value (Yes in step S1107), the region identifying section 203 and the subsequent region output section 204 execute subsequent processes on the image A211 (step S1108) and the intra-Image position calculator 202 terminates the series of processes.

On the other hand, when the intra-image position result is smaller than the specified value (No in step S1107), the region identifying section 203 and the subsequent region output section 204 do not execute the subsequent processes on the image A211 (step S1109) and the intra-mage position calculator 202 terminates the series of processes. In this case, the intra-image position result Ar511 (intra-image position result indicating a value smaller than the specified value) may be stored and referenced in another search for the same target object.

The perspective transformation process method of step S1104 is a method related to a transformation process of projecting an object on three-dimensional coordinates onto a two-dimensional surface. By the perspective transformation process method, a position where the same target object is included in the image may be estimated based on relationships between imaging surfaces of multiple cameras. For example, as illustrated in FIG. 1, the perspective transformation process calculates an intersection of a straight line coupling a three-dimensional position of a representative point of the target object to an imaging position and a camera imaging surface estimated from the imaging position, the orientation, and the camera parameter (including the focal length and the optical center). Then, a position corresponding to the intersection within the image is calculated as a two-dimensional position.

FIG. 12 is an explanatory diagram illustrating details of the perspective transformation process. In FIG. 12, an object P has a three-dimensional coordinate position in the real-world coordinate system. For example, the object P has a three-dimensional coordinate point (Pxw, Pyw, Pzw) in the world coordinate system with its real coordinate origin Ow and coordinate axes Xw, Yw, and Zw. The perspective transformation first uses information of the imaging position and orientation of the camera to transform the three-dimensional coordinate point (Pxw, Pyw, Pzw) in the world coordinate system into a three-dimensional coordinate point (Pxc, Pyc, Pzc) in a camera coordinate system.

The camera coordinate system is a coordinate system with its origin Oc at the position of the imaging device (camera) that has captured the image, and axes Xc, Yc, and Zc. The axis Xc extends in a lateral direction of the image. The axis Yc extends in a vertical direction of the image. The axis Zc extends in a depth direction of the image. For example, the perspective projection uses the imaging position of the camera to perform a translational motion to match the real coordinate origin Ow with the origin Oc of the camera coordinate system, and uses the imaging orientation of the camera to perform a process of transforming the axes Xw, Yw, and Zw of the world coordinate system into the axes Xc, Yc, and Zc of the camera coordinate system. The process corresponds to a rotational motion.

Then, the perspective projection uses the internal parameter of the camera to transform coordinate values (for example, [m] or the like) in a real coordinate scale in the camera coordinate system into coordinate values ([dot]) in a pixel unit scale and coordinate values based on a definition of the origin (the origin O of the image, for example, an upper left end of the image) at a two-dimensional position within the image.

For example, a position that is on an image and corresponds to the position of the object P, for example, the position (Px, Py, Pz) of the object P in the image in an image coordinate system (with its origin O and the axes x, y, and z) is calculated by executing scale transformation on the three-dimensional coordinate point (Pxc, Pyc, Pzc) of the object P in the camera coordinate system based on the focal length of the camera and changing the origin based on the position of the center of the image that is located where the origin of the camera coordinate system is included in the image. Then, the position (Ps=Px/Pz, Pt=Py/Pz) of the object P in the image in a normalized image coordinate system (with its origin O' and axes s and t) not depending on the distance between the image and the camera is calculated. Therefore, the final two-dimensional position (Ps, Pt) in the image is calculated.

Accordingly, it is possible to transform the three-dimensional coordinate position (Pxw, Pyw, Pzw) of the object P in the real-world coordinate system into the image coordinate point (Ps, Pt) and project the object P on the three-dimensional coordinates onto a two-dimensional screen.

To transform a three-dimensional coordinate position in the real-world coordinate system into a point in the image coordinate system via the perspective projection, the following Equations (1) to (3) are used.

$$\begin{bmatrix} P_{xc} \\ P_{yc} \\ P_{zc} \end{bmatrix} = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} P_{xw} \\ P_{yw} \\ P_{zw} \\ 1 \end{bmatrix} \quad (1)$$

In the foregoing Equation (1), as a translation-rotation homogeneous coordinate system translation matrix that is a coordinate system transformation matrix for transformation from the world coordinate system calculated from the imaging position and the orientation to the camera coordinate system, r11, r12, r13, r21, r22, r23, r31, r32, and r33 represent rotational components, and t1, t2, and t3 represent translational components. (Xw, Yw, Zw) represents three-dimensional coordinates in the world coordinate system.

The origin of the coordinate system may be aligned from the origin Ow of the real coordinate system to the origin Oc of the camera coordinate system based on the translational components (t1 to t3) of Equation (1). The rotational components (r11 to r33) may be used to transform three-dimensional coordinate values based on the coordinate axis definitions Xw, Yw, and Zw of the world coordinate system into three-dimensional coordinate values based on coordinate axis definitions Xc, Yc, and Zc of the camera coordinate system.

$$\begin{bmatrix} P_x \\ P_y \\ P_z \end{bmatrix} = \begin{bmatrix} f_x & 0 & C_x \\ 0 & f_y & C_y \\ 0 & 0 & 1 \end{bmatrix} \begin{bmatrix} P_{xc} \\ P_{yc} \\ P_{zc} \end{bmatrix} \quad (2)$$

According to the foregoing Equation (2), an internal parameter matrix of the camera is used to transform values of the camera coordinate system that are calculated according to Equation (1) into values of the image coordinate system in which the camera imaging surface (image screen) exists at the position of the object P. In Equation (2), fx and fy of the internal parameter matrix indicate x and y components of the focal length of the camera parameter Ap213 (illustrated in FIG. 7) in the lateral and vertical directions of the image and are values that are used to transform a position in the real scale into a pixel position on an image screen separated by a distance of 1 from the center (described later) of the camera.

In Equation (2), cx and cy indicate pixel positions of the optical center of the camera parameter Ap213 in the lateral and vertical directions and indicate the position of the origin Oc of the camera coordinate system within the image. The optical center indicates a value depending on the definition of the coordinate origin at the position within the image. As illustrated in FIG. 12, in some cases, the position within the image is represented by coordinate values, while an upper left end of the image is treated as the origin (origin O of the image). Thus, the optical center is used to change the definition of the coordinate origin.

Equation (2) is used to transform the three-dimensional coordinate position (Pxc, Pyc, Pzc) in the camera coordinate system with the axes Xc, Yc, and Zc into an image on the image screen that is located at the position of the object P, for example, into the position (Px, Py, Pz) in the image in the image coordinate system by performing scale transformation (for example, transformation from the real scale [m] to pixels [dot]) using the focal length of the internal parameter matrix and changing (changing from the image's center corresponding to a projection position of the origin Oc of the camera coordinate system in the image coordinate system to the origin O at the upper left end of the image) the definition of the origin using the optical center.

$$\begin{bmatrix} P_s \\ P_t \\ 1 \end{bmatrix} = \begin{bmatrix} P_x / P_z \\ P_y / P_z \\ 1 \end{bmatrix} \quad (3)$$

The foregoing Equation (3) is used to transform the position (Px, Py, Pz) in the image coordinate system that has been calculated according to Equation (2) into a position in the image in the two-dimensional normalized image coordinate system using normal three-dimensional coordinate transformation and calculate the final coordinates (Ps, Pt) of the position within the image. For example, the position (Px, Py, Pz) in the image coordinate system is a pixel position on the image screen that is separated by Pz from the center of the camera in the depth direction. Therefore, a range of the position (Px, Py, Pz) is increased by the distance Pz from the original pixel position. Therefore, fx and fy are normalized and transformed into a pixel position on the image screen separated by an assumed distance of 1 from the center of the camera by dividing the coordinate components by Pz. By executing the normalization transformation, the final coordinates (Ps=Px/Pz, Pt=Py/Pz) of the position within the image are obtained.

Equations (2) and (3) are an example. When the definitions of the x and y components fx and fy of the focal length of the camera internal parameter and the definitions of the coordinates cx and cy of the camera's optical center vary, Equations (2) and (3) may be changed based on the foregoing definitions.

Although omitted in Equation (2), a distortion correction coefficient may be considered in Equation (2). The distortion correction coefficient is stored together with the focal length and the optical center in the camera parameters Ap213.

In the foregoing manner, the perspective transformation process may be performed using the imaging position and orientation Aa212 and the camera parameter Ap213 to calculate, from the three-dimensional position Ao of the target object, the two-dimensional position groups of the target object that are included in the image.

(Details of Process by Region Identifying Section 203 and Details of Positional Information Ai512)

Next, specific details of the region identifying section 203 are described. As illustrated in FIG. 5, the region identifying section 203 receives the output intra-image position result Ar511 for the image A211 on which the region identifying section 203 and the subsequent section 204 has been determined by the intra-image position calculator 202 to execute the subsequent processes. Then, the region identifying section 203 calculates the region included in the image A211 and to be clipped out of the image A211. Then, the region identifying section 203 outputs the positional information Ai512 as a result of the calculation.

For example, the CPU 301 executes a program stored in the memory 302 in the information processing device 200 illustrated in FIG. 3, thereby enabling the region identifying section 203 to achieve functions of the region identifying section 203.

For example, the region identifying section 203 references the intra-image position result Ar511, calculates, as the region within the image, a rectangle circumscribing two-dimensional position groups of the target object that have been determined as being included in the image based on the estimated amount of the image region in which the target object is included in the image. Then, the region identifying section 203 outputs the positional information Ai512 defining the rectangle. The positional information Ai may indicate two-dimensional positions of upper left and lower right ends of the rectangle within the image, for example.

The region within the image may not be the rectangle and may be a graphic with arbitrary straight lines or with a curved line, for example, a polygonal, elliptical, or curve graphic. The region within the image may be a polygon formed by coupling the two-dimensional position groups or an ellipse including the two-dimensional position groups. The region within the image may not be the graphic accurately circumscribing the two-dimensional position groups and may be a graphic smaller than the circumscribed graphic or a graphic larger than the circumscribed graphic.

Figure 13:
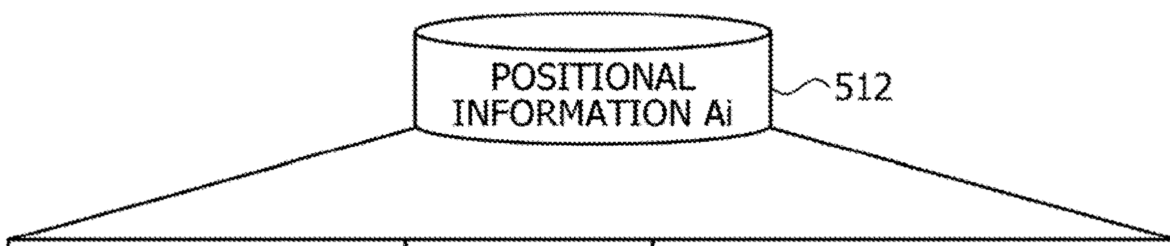
FIG. 13 is an explanatory diagram illustrating an example of a data configuration of positional information.

FIG. 13 is an explanatory diagram illustrating an example of a data configuration of the positional information Ai. In FIG. 13, the positional information Ai512 has various information including a "video ID", a "frame number", a "target object ID", a "target object type", the "number of points representing the target object", and "coordinates of positions within the image". The "video ID" is the identification information uniquely identifying the video including the image A211. The "frame number" is the information on the number of the frame in which the image A211 included in the video is included. The "video ID" and the "frame number" are the same as the "video ID" and the "frame number" that are indicated in the imaging position and orientation Aa212 illustrated in FIG. 6 and the intra-image position result Ar511 illustrated in FIG. 10.

The "target object ID" is the identification information uniquely identifying the target object. The "target object type" is the information indicating the type of the target object. The "target object ID" and the "target object type" are the same as the "target object ID" and the "target object type" that are indicated in the three-dimensional position Ao214 of the target object that is illustrated in FIG. 8.

The "number of points representing the target object" is the number of points representing the target object, for example, the number of points representing the image including the target object and to be clipped. The "number of points representing the target object" may be the same as or different from the number indicated in the three-dimensional position Ao of the target object that is illustrated in FIG. 8. The "number of points representing the target object" may be the same as or different from the number of two-dimensional position groups determined as being included in the image of the target object that are illustrated in FIG. 10.

Since the clipped image is normally managed as the rectangle, it is preferable that the "number of points representing the target object" be 4. However, the "number of points representing the target object" is not limited to 4, depending on the shape of the target object. Since the "number of points representing the target object" is "4", the "coordinates of the positions within the image" are indicated by four coordinate positions Pos[0] to Pos[3]. Each of the four coordinate positions Pos[0] to Pos[3] is represented by two dimensions x and y.

Figure 14:
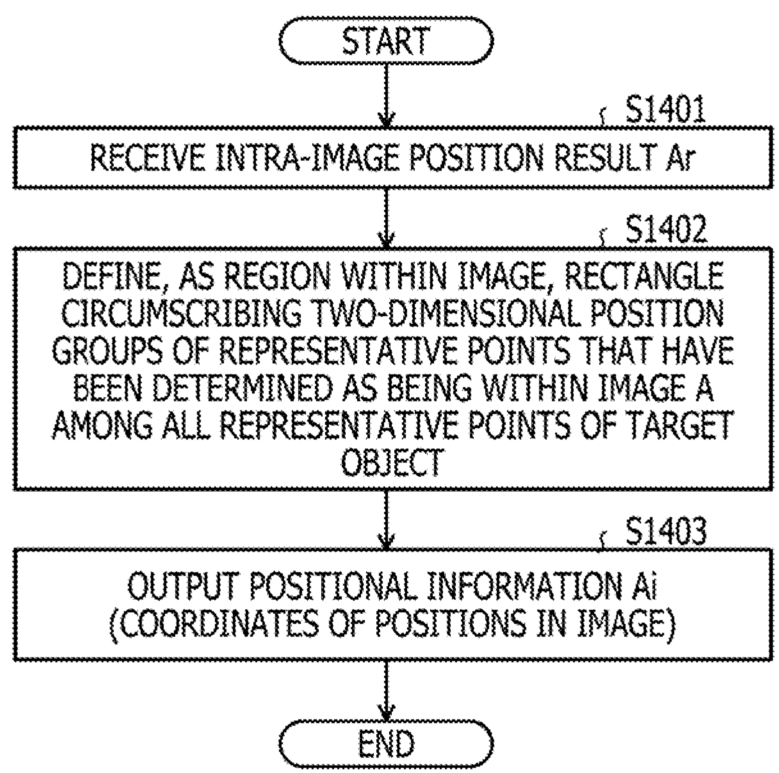
FIG. 14 is a flowchart illustrating an example of a procedure for a series of processes to be executed by a region identifying section.

FIG. 14 is a flowchart illustrating an example of a procedure for a series of processes to be executed by the region identifying section. In the flowchart of FIG. 14, the region identifying section 203 receives the intra-image position result Ar (intra-image position result indicating "1") 511 output by the intra-image position calculator 202 (step S1401).

Then, the region identifying section 203 defines, as the region within the image, the rectangle circumscribing the two-dimensional position groups of representative points that have been determined as being within the image A211 by the intra-image position calculator 202 among all representative points of the target object, and identifies coordinates of positions within the image (step S1402). After that, the region identifying unit 203 generates the positional information A512 (coordinates of the positions within the image) and outputs the generated positional information Ai512 (step S1403). Then, the region identifying section 203 terminates the series of processes.

(Details of Process by Region Output Section 204 and Details of Region Image Ab)

Next, specific details of the region output section 204 are described. As illustrated in FIG. 5, the region output section 204 receives the positional information Ai12 output by the region identifying section 203 and outputs the region image Ab513. For example, the CPU 301 executes a program stored in the memory 302 in the information processing device 200 illustrated in FIG. 3, thereby enabling the region output section 204 to achieve functions of the region output section 204. Alternatively, the network I/F 303 or the recording medium I/F 304 enables the region output section 204 to achieve the functions of the region output section 204.

Figure 15:
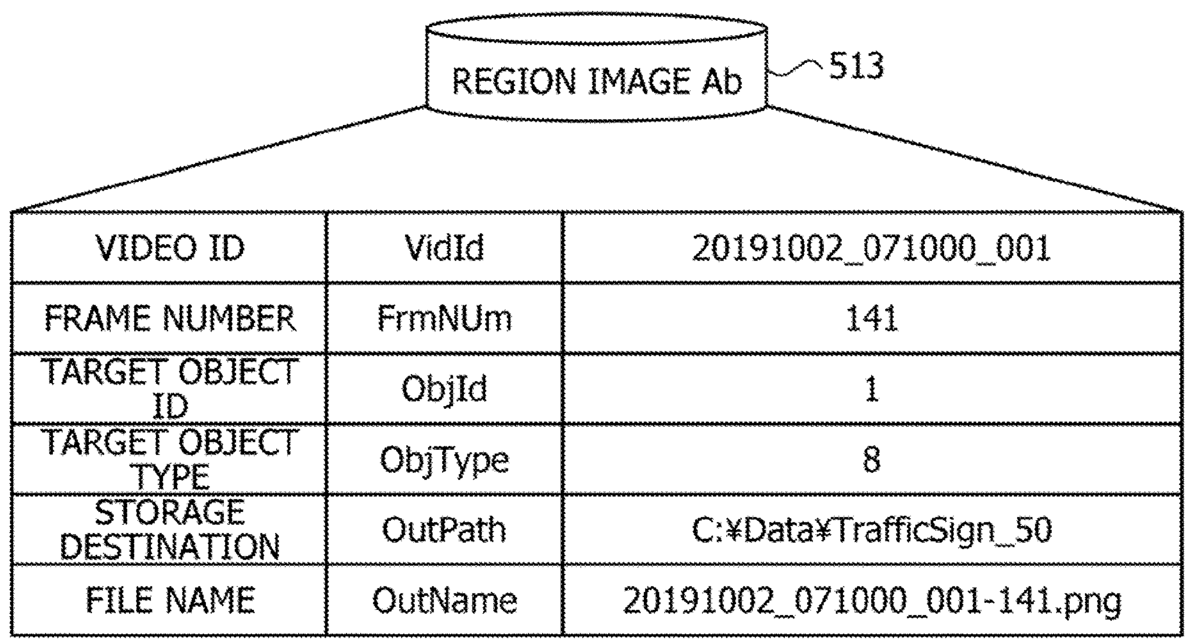
FIG. 15 is an explanatory diagram illustrating an example of a data configuration of a region image.

FIG. 15 is an explanatory diagram illustrating an example of a data configuration of the region image Ab. In FIG. 15, the region image Ab513 has various information including a "video ID", a "frame number", a "target object ID", a "target object type", a "storage destination", and a "file name". The "video ID" is the identification information uniquely identifying the video including the image A211. The "frame number" is the information on the number of the frame in which the image A211 included in the video is included. The "video ID" and the "frame number" are the same as the "video ID" and the "frame number" that are indicated in the imaging position and orientation Aa212 illustrated in FIG. 6 and the intra-image position result Ar511 illustrated in FIG. 10.

The "target object ID" is the identification information uniquely identifying the target object. The "target object type" is the information indicating the type of the target object. The "target object ID" and the "target object type" are the same as the "target object IDs" and the "target object types" that are indicated in the three-dimensional position Ao214 illustrated in FIG. 8 and are indicated in the positional information Ai512 illustrated in FIG. 13. The "storage destination" is information on a folder for storing the clipped region image. The "file name" is information on the name of a file of the clipped region image.

Figure 16:
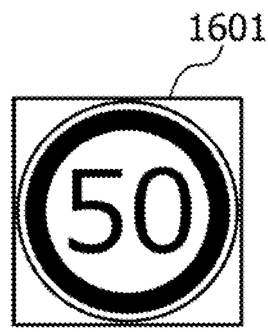
FIG. 16 is an explanatory diagram illustrating an example of an clipped region image.

FIG. 16 is an explanatory diagram illustrating an example of the clipped region image. As illustrated in FIG. 16, a clipped region image 1601 is the road sign indicating the speed limit of 50 km/h. The road sign is an example of the feature. The region image 1601 is stored as data in a predetermined format, such as bitmap or JPEG.

For example, the feature may be a sign, a traffic light, a guardrail, a curb on a road, a white line, a crosswalk, a stop line, or road surface paint (sign, such as character sign or arrow). The feature may be a sign, such as a subway sign, a police box sign, an arbitrary shop sign, or a facility sign, or a road incidental facility, such as a railroad crossing, a footbridge, a fee station, a road stud, a zebra zone, or a poll.

The feature may be a utility pole, a bus stop display, a telephone box, a mail box, a taxi stand display, a vending machine, or the like. The feature may be a gutter, a manhole, a cushion drum, or the like. The feature may be a barricade, a pylon, a parking space (road marking frame), a parking fee payment machine, a garbage collection box, a fire hydrant, a shop window of an arbitrary shop, a roadside tree, or the like.

When the feature is an object that may be included in a captured image and exists at a three-dimensional position that may be acquired, the feature is to be clipped.

Figure 17:
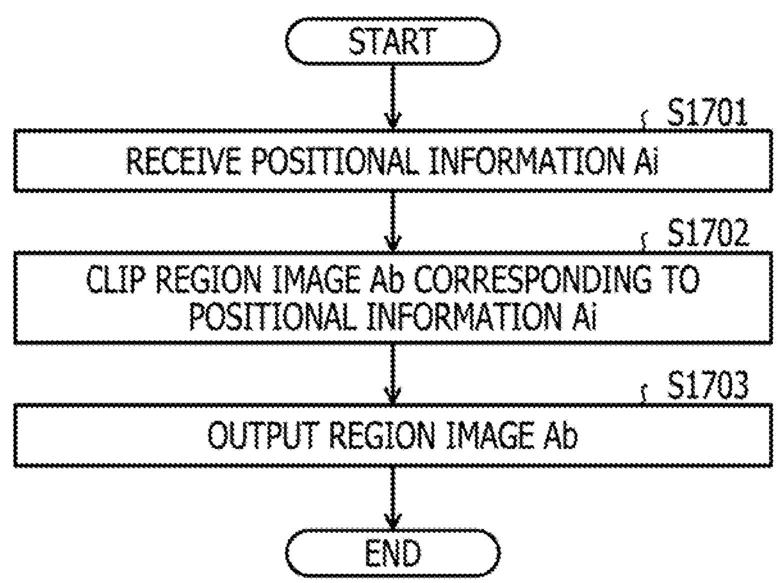
FIG. 17 is a flowchart illustrating an example of a procedure for a series of processes to be executed by a region output section.

FIG. 17 is a flowchart illustrating an example of a procedure for a series of processes to be executed by the region output section. In the flowchart of FIG. 17, the region output section 204 receives the positional information Ai512 output by the region identifying section 203 (step S1701). Then, the region output section 204 clips the region image Ab513 corresponding to the positional information Ai512 (step S1702). For example, the region output section 204 clips the region image based on the coordinates of the positions within the image that are indicated in the positional information Ai512 illustrated in FIG. 13. Then, the region output section 204 generates a file of the region image Ab513 illustrated in FIG. 15 for the clipped region image.

After that, the region output section 204 outputs the region image Ab513 (step S1703). For example, the region output section 204 records the file of the region image Ab513 in the recording medium 305 illustrated in FIG. 3 or outputs the file of the region image Ab513 to the other information processing device via the network 310. Therefore, the clipped region image Ab may be accumulated together with the region image 1601 in a predetermined storage region and may be used as teacher data for machine learning (deep learning).

As described above, to clip a region of a target object out of an image, the information processing device 200 according to the embodiment references the storage section storing three-dimensional position information on a three-dimensional position of the target object and may calculate the region of the target object within the image from the three-dimensional position information on the three-dimensional position using information on an imaging position for the image and orientation for the image.

Therefore, when a calculated and clipped image region is used as teacher data for machine learning, it is possible to automatically clip an image region including the target object out of an arbitrary image or video without a person's operation. Accordingly, it is possible to use an arbitrary scene to collect sufficient teacher data for machine learning and execute learning using the collected teacher data for machine learning.

According to the information processing device 200 according to the embodiment, the image may be captured by the imaging device or may be captured by the imaging device during traveling. It is, therefore, possible to easily acquire a large amount of images related to teacher data for machine learning.

The information processing device 200 according to the embodiment may calculate the region of the target object within the image using the information on the imaging position for the image, the orientation for the image, and information on a parameter of the imaging device. It is, therefore, possible to accurately calculate the region of the target object.

The information processing device 200 according to the embodiment may calculate the region of the target object within the image by the perspective transformation process. It is, therefore, possible to quickly calculate a region including a two-dimensional position where the target object is included in the image, from the three-dimensional position information on the three-dimensional position of the target object.

The information processing device 200 according to the embodiment may calculate the amount of the image region in which the target object is included in the image, and determine whether the target object is included in the image, based on the calculated amount of the region. When the target object is included in the image as a result of the determination, the information processing device 200 may calculate the region of the target object within the image. It is, therefore, possible to search for the image while avoiding an image not including the target object or an image including only a part of the target object. It is sufficient if the subsequent image clipping process is executed only on the image including the target object. Teacher data for machine learning may be efficiently collected.

The information processing device 200 according to the embodiment may clip the image of the target object based on the result of calculating the region of the target object within the image. It is, therefore, possible to automatically execute the process of clipping the image.

The information processing device 200 according to the embodiment may acquire the information on the imaging position for the image and the orientation for the image via V-SLAM using the image. It is, therefore, possible to efficiently extract the information on the imaging position for the image and the orientation for the image.

The information processing device 200 according to the embodiment may use the triangulation to determine the three-dimensional positional information on the three-dimensional position. It is, therefore, possible to more easily acquire the three-dimensional positional information on the three-dimensional position.

According to the information processing device 200 according to the embodiment, the target object may be a feature displayed in the image. Therefore, the feature may be used as teacher data for machine learning.

According to the information processing device 200 according to the embodiment, the imaging device may be a camera mounted on a moving body. It is, therefore, possible to acquire teacher data for machine learning for the target object (feature) from an image captured during traveling.

The region clipping method described in the embodiment may be achieved by causing a computer, such as a personal computer or a workstation, to execute a program prepared in advance. A program for distributing the foregoing programs is stored in a computer-readable recording medium, such as a hard disk, a flexible disk, a compact disc (CD)-ROM, a magneto-optical (MO) disk, a digital versatile disc (DVD), or a Universal Serial Bus (USB) memory. The program for distributing the programs is read by the computer from the recording medium and executed by the computer. The region clipping program may be distributed via a network, such as the Internet.

The information processing device 200 described in the embodiment may be achieved by an application specific IC, such as a standard cell application-specific integrated circuit (ASIC) or a structured ASIC, or a programmable logic device (PLD), such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A region clipping method, performed by a computer, for clipping a region of a target object out of an image, the method comprising:

referencing a memory storing three-dimensional positional information of the target object; and calculating, by using information on an imaging position and orientation of an imaging device for capturing the image, the region of the target object within the image from the three-dimensional positional information.

2. The region clipping method according to claim 1, further comprising:

capturing the image with the imaging device.

3. The region clipping method according to claim 2, wherein the image is captured by the imaging device while the imaging device is moving.

4. The region clipping method according to claim 2, wherein the calculating calculates the region of the target object within the image using the information on the imaging position and the orientation of the imaging device for capturing the image and information on a parameter of the imaging device.

5. The region clipping method according to claim 1, wherein the calculating calculates the region of the target object within the image is calculated by a perspective transformation process.

6. The region clipping method according to claim 1, further comprising:

determining whether the target object is included in the image, wherein calculating the region of the target object in the image when the target object is included in the image as a result of the determining.

7. The region clipping method according to claim 1, further comprising:

clipping an image of the target object based on a result of the calculating the region of the target object within the image.

8. The region clipping method according to claim 1, further comprising:

acquiring the information on the imaging position and the orientation of the imaging device for capturing the image by executing V-SLAM (Visual-Simultaneous Localization And Mapping) using the image.

9. The region clipping method according to claim 1, wherein the three-dimensional positional information is determined using triangulation.

10. The region clipping method according to claim 1, wherein the target object is a feature displayed in the image.

11. The region clipping method according to claim 2, wherein the imaging device is a camera mounted on a moving body.

12. A non-transitory computer-readable storage medium having stored a region clipping program for causing a computer, when executed, to:

reference a memory storing three-dimensional positional information of a target object; and calculate, by using information on an imaging position and orientation of an imaging device for capturing the image, a region of the target object within the image from the three-dimensional positional information.

13. An image processing device for identifying a region including at least a portion of a target object within an image, the image processing device comprising:

a memory configured to store three-dimensional positional information of a target object; and a processor coupled to the memory and configured to:

calculate by using information on an imaging position and orientation of an imaging device for capturing the image, the region including at least the portion of the target image within the image from the three-dimensional positional information; and clip the image of the target object based on a result of the calculating the region of the target object within the image.

14. The image processing device according to claim 13, wherein the processor is further configured to store in the memory a result of the clipping.

15. The image processing device according to claim 14, wherein the processor repeatedly performs the calculate, the clip and the store to generate a teacher data set for machine learning.

16. The image processing device according to claim 13, wherein the imaging device is configured to be mounted on a body and capture the image while the body is moving.

17. The image processing device according to claim 16, wherein the body is a vehicle and the clipped image is used to update at least one of traffic information, road information, and environmental information relative to the vehicle.

18. The image processing device according to claim 13, wherein the processor calculates the region using the information on the imaging position and the orientation of the imaging device for capturing the image and information on a parameter of the imaging device.

19. The image processing device according to claim 13, wherein the processor calculates the region with a transformation process.

* * * * *